(12) United States Patent
Haase et al.

(10) Patent No.: US 11,585,990 B2
(45) Date of Patent: Feb. 21, 2023

(54) STACKABLE OPTICAL FERRULE AND CONNECTOR USING SAME

(71) Applicant: 3M INNOVATIVE PROPERTIES COMPANY, St. Paul, MN (US)

(72) Inventors: Michael A. Haase, St. Paul, MN (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/977,111

(22) PCT Filed: Mar. 14, 2019

(86) PCT No.: PCT/IB2019/052085
§ 371 (c)(1),
(2) Date: Sep. 1, 2020

(87) PCT Pub. No.: WO2019/180555
PCT Pub. Date: Sep. 26, 2019

(65) Prior Publication Data
US 2021/0011230 A1    Jan. 14, 2021

Related U.S. Application Data

(60) Provisional application No. 62/646,495, filed on Mar. 22, 2018.

(51) Int. Cl.
G02B 6/38 (2006.01)
G02B 6/36 (2006.01)
G02B 6/40 (2006.01)

(52) U.S. Cl.
CPC .......... *G02B 6/406* (2013.01); *G02B 6/3676* (2013.01); *G02B 6/383* (2013.01); *G02B 6/3885* (2013.01)

(58) Field of Classification Search
CPC ...... G02B 6/406; G02B 6/3676; G02B 6/383; G02B 6/3885
(Continued)

(56) References Cited

U.S. PATENT DOCUMENTS 3,954,338 A    5/1976 Hennel et al.
4,148,557 A    4/1979 Garvey
(Continued)

FOREIGN PATENT DOCUMENTS

WO    WO 2013/048730    4/2013
WO    WO 2013/048743    4/2013
(Continued)

OTHER PUBLICATIONS

PCT International Search Report from PCT/IB2019/052085, dated May 28, 2019, 3 pages.

*Primary Examiner* — Kaveh C Kianni
*Assistant Examiner* — Hung Q Lam
(74) *Attorney, Agent, or Firm* — Jonathan L. Tolstedt

(57) ABSTRACT

An optical ferrule includes an optical coupling member with a light redirecting element that redirects input light from a waveguide toward an output window. The optical coupling member has a mating surface configured to slidably mate with a mating optical coupling member along a longitudinal axis of the optical ferrule. The optical ferrule also includes at least one stacking member along a longitudinal edge of the optical coupling member. The stacking member has a distal end extending beyond one of the mating surface and a top surface opposed to the mating surface. The stacking member also has a contact surface opposed to the distal end. The contact surface is configured to rotatably interface with a corresponding distal end of a of an adjacently stacked optical ferrule.

20 Claims, 13 Drawing Sheets

(58) Field of Classification Search
USPC .............. 385/54–56, 58–61, 65, 89, 92–94
See application file for complete search history.

(56) References Cited

U.S. PATENT DOCUMENTS

| | | | |
|---|---|---|---|
| 4,812,006 | A | 3/1989 | Osborn et al. |
| 5,381,498 | A | 1/1995 | Bylander |
| 6,026,210 | A | 2/2000 | Berglund et al. |
| 6,571,048 | B1 | 5/2003 | Bechamps et al. |
| 6,624,512 | B2 | 9/2003 | Kurusu |
| 6,729,773 | B1 | 5/2004 | Finona et al. |
| 7,066,657 | B2 | 6/2006 | Murali et al. |
| 7,121,732 | B2 | 10/2006 | Pimpinella et al. |
| 7,454,105 | B2 | 11/2008 | Yi et al. |
| 7,473,038 | B2 | 1/2009 | Fujiwara et al. |
| 7,534,052 | B2 | 5/2009 | Fujiwara et al. |
| 7,726,885 | B2 | 6/2010 | Nishimura et al. |
| 8,165,432 | B2 | 4/2012 | Ohta et al. |
| 2011/0317959 | A1 | 12/2011 | Ohta et al. |
| 2015/0219863 | A1* | 8/2015 | Haase ............... G02B 6/3885 385/60 |
| 2017/0059785 | A1* | 3/2017 | Smith ............... G02B 6/3885 |

FOREIGN PATENT DOCUMENTS

| | | |
|---|---|---|
| WO | WO 2013/180943 | 12/2013 |
| WO | WO 2014/055226 | 4/2014 |
| WO | WO 2014/055361 | 4/2014 |
| WO | WO 2017/066135 | 4/2017 |
| WO | WO 2017/066137 | 4/2017 |
| WO | WO 2017/066140 | 4/2017 |

* cited by examiner

STACKABLE OPTICAL FERRULE AND CONNECTOR USING SAME

TECHNICAL FIELD

This disclosure relates generally to optical connector assemblies and methods related to optical connector assemblies.

BACKGROUND

Optical connectors can be used for optical communications in a variety of applications including telecommunications networks, local area networks, data center links, and internal links in computer devices. There is interest in extending optical communication to applications inside smaller consumer electronic appliances such as laptops and even cell phones. Expanded optical beams may be used in connectors for these systems to provide an optical connection that is less sensitive to dust and other forms of contamination and so that alignment tolerances may be relaxed. Generally, an expanded beam is a beam that is larger in diameter than the core of an associated optical waveguide (usually an optical fiber). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by another waveguide after focusing of the beam via another lens or mirror.

BRIEF SUMMARY

Embodiments described herein are directed to optical ferrules, connector assemblies using the optical ferrules, and method of making the optical ferrules. In one embodiment, an optical ferrule includes an optical coupling member that includes one or more light redirecting elements configured to redirect input light from a waveguide attached to the optical coupling member toward an output window of the optical coupling member. The optical coupling member has a mating surface that includes the output window. The mating surface is configured to slidably mate with a mating surface of a mating optical coupling member along a longitudinal axis of the optical ferrule. The optical ferrule also includes at least one stacking member along a longitudinal edge of the optical coupling member. The at least one stacking member has a distal end extending beyond one of the mating surface and a top surface opposed to the mating surface. The stacking member also has a contact surface opposed to the distal end. The contact surface is configured to rotatably interface with a corresponding distal end of a corresponding stacking support member of an adjacently stacked optical ferrule.

In some configurations, the contact surface is further configured to slidably interface with the corresponding distal end of the corresponding stacking support member. The at least one stacking member may include first and second stacking members respectively located along opposing longitudinal edges of the optical coupling member. In such an embodiment the first and second stacking members may be mirror images of one another, and the first and second stacking members may optionally align the optical ferrule in a side-to-side direction with a corresponding optical coupling member of the adjacently stacked optical ferrule.

In other configurations, the contact surface may include a flat surface or a curved surface. The stacking member may include a triangular shape, a vertex of the triangular shape corresponding to the distal end. The contact surface and the corresponding distal end may include a groove and a ridge. In such a case, the ridge fits into the groove in an unmated configuration of the optical ferrule and the adjacently stacked optical ferrule. The ridge and the groove align the optical ferrule and the adjacently stacked optical ferrule in a side-to-side direction.

In some configurations, the distal end extends beyond the mating surface and the contact surface may be recessed below the top surface of the optical coupling member. Alternatively, the distal end may extend beyond the mating surface and the contact surface may extend beyond the top surface of the optical coupling member. Or, the distal end may extend beyond the top surface and the contact surface may be recessed below the mating surface of the optical coupling member.

In one configuration, the optical ferrule and the adjacently stacked optical ferrule are part of a first connector and configured to optically interface with respective first and second stacked mating optical ferrules of a second connector in a mated configuration. In such a case, the contact surface is separated from the corresponding distal end of the corresponding stacking support member in the mated configuration. The stacking members of the optical ferrule and the adjacently stacked optical ferrule of the first connector may include stop surfaces that contact with corresponding stop surfaces of first and second stacking support members of the first and second stacked optical ferrules of the first connector in the mated configuration.

In another embodiment, an optical ferrule includes an optical coupling member having one or more light redirecting elements configured to redirect input light toward an output window of the optical coupling member. The optical coupling member has a mating surface that includes the output window. The mating surface configured to slidably mate with a mating surface of a mating optical coupling member along a longitudinal axis of the optical ferrule. First and second extensions are on opposed longitudinal edges of the optical coupling member, the first and second extensions extending beyond at least one of the mating surface and a top surface opposed to the mating surface. A first contact surface is on the first extension. The first contact surface is configured to slidably interface with an extension of a corresponding stacking support member of an adjacently stacked optical ferrule.

In some configurations, the optical ferrule may further include a second contact surface on the second extension. The second contact surface is configured to slidably interface with another extension of the corresponding stacking support member. In some configurations, the first and second extensions may be mirror images of one another, and/or the first contact surface may include a flat surface or a curved surface.

In some configurations, the extension may include a triangular shape. A vertex of the triangular shape slidably interfaces with a contact surface of a second adjacently stacked optical ferrule. In other configurations, the first contact surface may be recessed below a top surface of the optical coupling member, the top surface being opposed to the mating surface.

In some embodiments, the optical ferrule and the adjacently stacked optical ferrule may be part of a first connector and are configured to optically interface with respective first and second stacked mating optical ferrules of a second connector in a mated configuration. The first contact surface is separated from the corresponding distal end of the corresponding stacking support member in the mated configuration. The stacking support members of the optical ferrule and the adjacently stacked optical ferrule of the first connector may include stop surfaces that contact with corresponding stop surfaces of first and second stacking support members of the first and second stacked optical ferrules of the first connector in the mated configuration.

In another embodiment, a connector includes a housing and at least one column of one or more adjacent optical cable assemblies disposed in the housing. Each set of optical cable subassemblies includes at least two optical cable subassemblies. Each optical cable subassembly includes an optical ferrule with an optical coupling member. The optical coupling member includes one or more light redirecting elements configured to redirect input light toward an output window of the optical coupling member. The optical coupling member also has a mating surface that includes the output window. The mating surface is configured to slidably mate with a mating surface of a mating optical coupling member along a longitudinal axis of the optical ferrule. The optical ferrule further includes at least one extension along a longitudinal edge of the optical coupling member. The extension includes a distal end extending beyond the mating surface and a contact surface opposed to the distal end. The contact surface is configured to rotatably interface with a corresponding distal end of a corresponding extension of an adjacently stacked optical ferrule. Each optical cable subassembly further includes one or more optical waveguides attached to the optical ferrule. In an unmated configuration of the connector, the distal end of a first optical cable subassembly of the at least one column rotatably interfaces with the contact surface of a second optical cable subassembly of the at least one column.

In one configuration, the distal end of the first optical cable subassembly may slidably interface with the contact surface of the second optical cable subassembly. The distal end of the extension of only a selected one of the optical ferrules of the at least one column may interface with a ferrule support attached to or integral with the connector housing. The optical ferrules of the column may be unsupported by the housing except for the selected optical ferrule. The one or more optical waveguides in the cable assemblies may apply spring forces to the respective optical ferrules. The spring forces hold the distal end of the first optical cable subassembly against the contact surface of the second optical cable subassembly and further hold the extension of selected optical ferrule against the ferrule support. In a mated configuration, the spring forces may be applied between the mating surfaces of the at least one column with corresponding mating surfaces of a column of mating optical cable assemblies such that the extension of the first optical cable subassembly is separated from the contact surface of the second optical cable subassembly and the extension of the selected optical ferrule is separated from the ferrule support.

In another embodiment, a connector includes a housing having at least one support extending respectively from at least one of first and second interior walls of the housing. Two or more optical cables assemblies are stacked between the first and second interior walls. Each of the two or more optical cable subassemblies include one or more optical waveguides and an optical ferrule having one or more light redirecting elements configured to redirect input light toward an output window of the optical coupling member. The optical ferrule has a mating surface that includes the output window. The mating surface is configured to slidably mate with a mating surface of a mating optical coupling member along a longitudinal axis of the optical ferrule. An extension is located along a longitudinal edge of the optical ferrule and extends beyond the mating surface. A contact surface is located along the longitudinal edge. The extension of a first of the two or more optical cable assemblies slidably interfaces with the contact surface of a second of the two or more optical cable assemblies. The extension of the second optical cable subassembly slidably interfaces with the at least one support of the housing.

In some configurations, the distal end of the first optical cable subassembly may rotatably interface with the contact surface of the second optical cable subassembly. The two or more optical cable assemblies are unsupported by the at least one support except for the first optical cable subassembly. The one or more optical waveguides may apply spring forces to the respective optical ferrules. The spring forces may hold the extension of the first optical cable subassembly against the contact surface of the second optical cable subassembly and further hold the extension of second optical cable subassembly against the at least one support. In a mated configuration, the spring forces may be applied between the mating surfaces of the two or more optical cable assemblies with corresponding mating surfaces of mating optical cable assemblies such that the extension of the first optical cable subassembly is separated from the contact surface of the second optical cable subassembly and the extension of the selected optical ferrule is separated from at least one support.

In another embodiment, a connector includes a housing and two or more columns of optical cable assemblies located side-by-side within the housing. Each optical cable subassembly includes an optical ferrule with an optical coupling member that has one or more light redirecting elements configured to redirect input light toward an output window of the optical coupling member. The optical coupling member has a mating surface that includes the output window. The mating surface is configured to slidably mate with a mating surface of a mating optical coupling member along a longitudinal axis of the optical ferrule. The optical ferrule includes at least one extension along a longitudinal edge of the optical coupling member. The at least one extension extends beyond the mating surface. The optical ferrule includes a contact surface opposed to the at least one extension. The contact surface is configured to rotatably interface with a corresponding extension of an adjacently stacked optical ferrule. One or more optical waveguides are attached to the optical ferrule. The extension of a first optical cable subassembly of each column slidably interfaces with the contact surface of a second optical cable subassembly of each column.

In some configurations, the extension of only a selected one optical ferrule of each column may interface with a ferrule support attached to or integral with the connector housing. The optical ferrules of the two or more columns may be unsupported by the housing except for the selected optical ferrules of each column. For each column, the one or more optical waveguides in the cable assemblies may apply spring forces to the respective optical ferrules. The spring forces hold the distal end of the first optical cable subassembly against the contact surface of the second optical cable subassembly and further hold the extension of selected optical ferrule against the ferrule support. In a mated configuration, the spring forces may be applied between the mating surfaces of each column with corresponding mating surfaces of corresponding columns of mating optical cable assemblies such that, for each column, the extension of the first optical cable subassembly is separated from the contact surface of the second optical cable subassembly and the extension of the selected optical ferrule is separated from the ferrule support.

In some configurations, the housing may further include one or more inner sidewalls separating the two or more columns of optical cable assemblies, the one or more inner sidewalls limiting side-to-side movement of the two or more columns within the housing. The connector may include one or more side supports separating the two or more columns of optical cable assemblies. The one or more side supports limit side-to-side movement within the housing of at least one optical ferrule within each of the two or more columns.

In another embodiment, a molded, unitary, optical ferrule includes at least one stacking member along a longitudinal edge of the optical ferrule and one or more parting line artifacts. The one or more parting line artifacts include a parting line artifact extending substantially around an external perimeter of the optical ferrule. The parting line artifacts divide a surface of the optical ferrule into a first section along a first direction of a thickness axis and an opposing second section along a second direction of the thickness axis. The first section includes a contact surface of the stacking member, one or more elements configured to receive and secure an optical waveguide, and one or more elements configured to redirect input light within the unitary optical ferrule. The second section includes at least one output window configured to transmit the redirected light out of a mating surface and a distal end of the stacking member extending beyond the mating surface. The distal end is configured to interface with a corresponding contact surface of a corresponding optical ferrule.

In some configurations, at least part of the parting artifact may extend along an intersection between the mating surface and the longitudinal edge. The stacking member may include first and second stacking members respectively located along opposing longitudinal edges of the optical coupling member. The first and second stacking members may be mirror images of one another. The contact surface may include a flat surface or a curved surface. The stacking member may have a triangular shape, a vertex of the triangular shape configured to interface with the corresponding contact surface. The contact surface may be recessed below a top surface of the optical coupling member, the top surface opposed to the mating surface.

In another embodiment, a mold is operable to injection mold a unitary, optical ferrule. The mold has a first part configured to form: a contact surface of a stacking member of the unitary, optical ferrule; one or more elements of the unitary, optical ferrule configured to receive and secure an optical waveguide; and one or more elements of the unitary, optical ferrule configured to redirect input light within the unitary optical ferrule. The mold includes a second part configured to form: at least one output window of the unitary, optical ferrule configured to transmit the redirected light out of a mating surface of the unitary, optical ferrule; and a distal end of the stacking member extending beyond the mating surface. The distal end is configured to interface with a corresponding contact surface of a corresponding optical ferrule. Respective first and second surfaces of the first and second parts form one or more parting line artifacts. The one or more parting line artifacts including a parting line artifact extending substantially around an external perimeter of the unitary optical ferrule. At least part of the parting artifact may extend along an intersection between the mating surface and the longitudinal edge.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein involve optical cable subassemblies, optical connectors and related methods. Optical cables and connectors used in many applications may make use of one waveguide or arrays of multiple parallel waveguides (e.g., 4, 8 or 12 or more parallel waveguides). The individual waveguides are typically optical fibers made of glass with a protective buffer coating, and the parallel buffered fibers are enclosed by a jacket. Optical connectors are useful for connecting optical waveguides to optical waveguides, or waveguides to optoelectronic components, for in-line interconnects and/or printed circuit board (PCB) connections, e.g., backplane, frontplane, or midplane connections.

One type of connector is an expanded beam connector, in which light is coupled between waveguides in a beam that is larger in diameter than the core of an associated optical waveguide and, in the case of waveguide arrays, typically somewhat less than the waveguide-to-waveguide pitch. The waveguides may comprise optical fibers, e.g., single-mode fibers or multi-mode fibers for fiber optic communication systems. These expanded beam optical connectors can have non-contact optical coupling and can provide effective optical coupling with relaxed connector-to-connector mechanical alignment precision when compared with other types of optical connectors, such as physical contact connectors.

Figure 1:
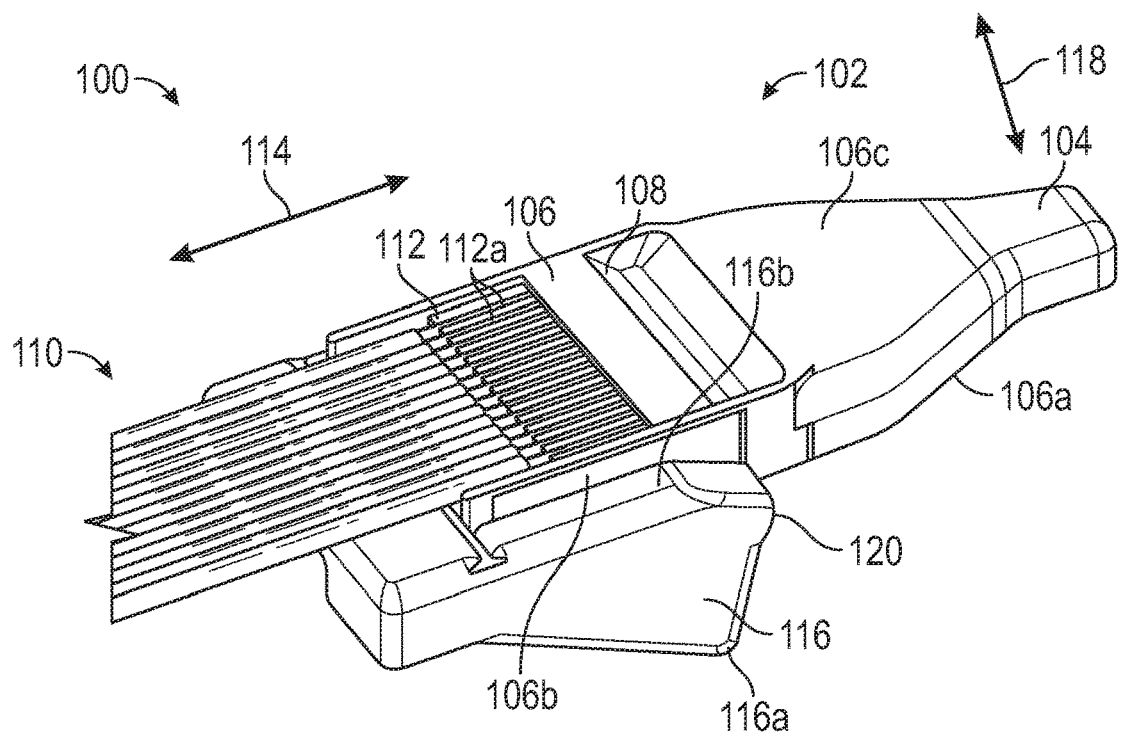
FIGS. 1 and 2 are perspective views of an optical cable subassembly in accordance with some embodiments.

FIG. 1 shows an optical cable subassembly 100 in accordance with some embodiments. The optical cable subassembly 100 includes one or more optical waveguides 110 (shown here as optical fibers) and an optical ferrule 102 (also sometimes referred to as an optical coupling unit). The illustrated optical waveguide 110 includes at least one core with a cladding, wherein the core and cladding are configured propagate light within the core, e.g., by total internal reflection. The optical waveguide 110 may be, for example, a single or multi-mode waveguide, a single core fiber, a multi-core optical fiber, or a polymeric waveguide. The waveguide may have any suitable cross-sectional shape, e.g., circular, square, rectangular etc.

The optical ferrule 102 is configured to mate, e.g., hermaphroditically, with another optical ferrule. The optical ferrule 102 illustrated in FIG. 1 includes an optical coupling member 106 generally configured to redirect light input from the optical waveguide 110. The optical coupling member 106 includes a light-redirecting element 108 which may be configured as one or more optical components (e.g., mirrors, prisms, lenses, etc.) formed within the optical coupling member 106. The light-redirecting element 108 redirects the light from the optical waveguide 110 to a mating surface 106a of the optical coupling member 106 that includes an output window (see FIG. 2). The mating surface 106a is opposed to a top surface 106c of the optical coupling member 106.

A mechanical mating tongue 104 extends from (and may be integral to) the optical coupling member 106. The mating tongue 104 aligns the optical ferrule 102 with a corresponding mechanical mating tongue of a mating optical ferrule (not shown in FIG. 1). As will be described in greater detail below, the mating optical ferrule includes a corresponding mating surface that facilitates mechanical and optical coupling with the mating surface 106a in a mated configuration of the optical ferrules. The mating surface 106a is configured to slidably contact the corresponding mating surface along a longitudinal direction 114 of the optical ferrule 102. Generally, the mating optical ferrule is longitudinally aligned with and inverted in orientation relative to the illustrated optical ferrule 102 such that the corresponding mating surface of the mating optical ferrule faces towards the mating surface 106a. In some embodiments, the mating tongue 104 can have a tapering width along at least a portion of a length of the tongue portion as shown in the illustrations. The mating tongue 104 can extend towards or outwardly from a front of a connector housing (not shown in FIG. 1).

The optical coupling member 106 includes an attachment area 112 with plurality of grooves. In the illustrated embodiment, the grooves 112a within the attachment area 112 are aligned in the longitudinal direction 114. Each groove 112a is configured to accommodate a different one of the optical waveguides 110. The grooves 112a are oriented in the longitudinal direction 114 and configured to receive and permanently attach respective ones of the optical waveguides 110 to a respective groove at the attachment area 112, e.g., using an adhesive.

At least one stacking support member 116 is located along a longitudinal edge 106b of the optical coupling member 106. The stacking support member 116 has a distal end 116a extending beyond the mating surface 106a and a contact surface 116b opposed to the distal end 116a. The contact surface 116b is configured to rotatably and/or slidably interface with a corresponding distal end of a corresponding stacking support member of an adjacently stacked optical ferrule (not shown in FIG. 1). The illustrated contact surface 116b is a flat surface, although in some configurations the contact surface 116b could be either a convex or concave curve, and may include a combination of curves and flats. Generally, the adjacently stacked optical ferrule is located vertically above the illustrated optical ferrule 102, and other adjacently stacked optical ferrules may be vertically below the illustrated optical ferrule 102. The vertical direction is indicated by arrow 118, is normal to the mating direction of a housing that contains the optical ferrule 102. In the latter case, the distal end 116a of the stacking support member 116 rotatably and/or slidably interfaces with a corresponding contact surface of the adjacently stacked optical ferrule.

The stacking support member 116 is also shown with a stop surface 120 that contacts a corresponding stop surface of a mating optical ferrule in the mated configuration. The stop surfaces fix the longitudinal orientation of the mated optical ferrules relative to one another. As will be described in further detail below, other features of the optical ferrule 102 such as the shape of the mating tongue 104 provide alignment in other directions between the mated optical ferrules, and may be used instead of or in addition to the stop surface 120.

Figure 2:
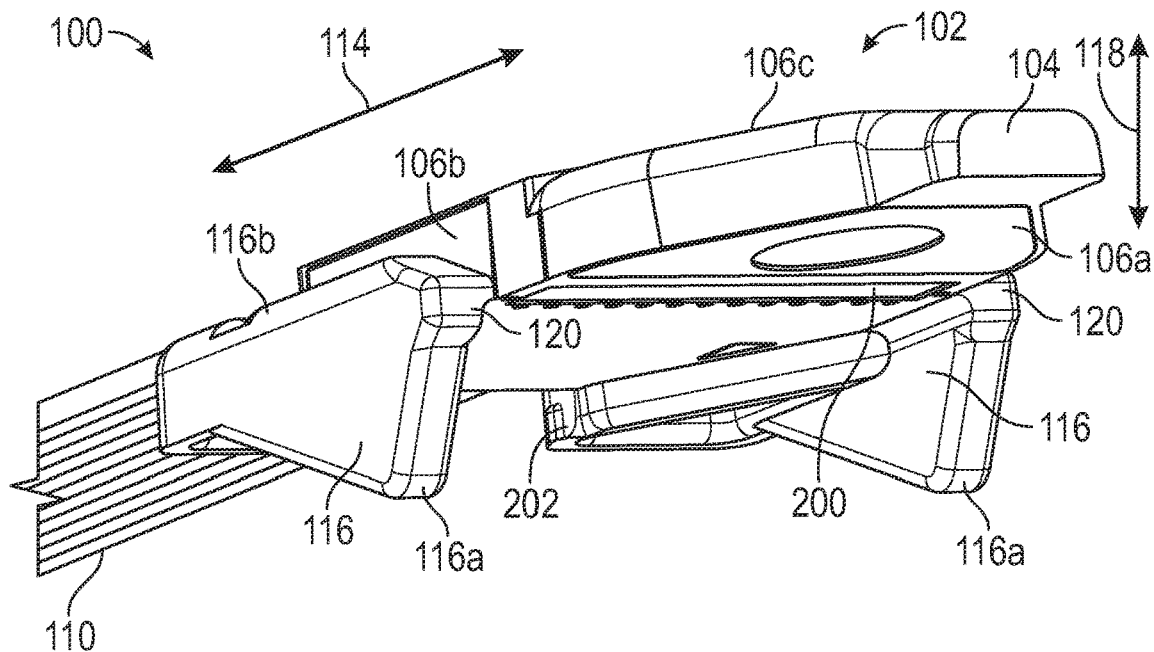

In FIG. 2, a perspective view shows additional features of the optical cable subassembly 100 according to an example embodiment. As seen in this view, the mating surface 106a of the optical coupling member 106 includes a window 200 which is part of an optical path within the optical coupling member 106. Light received from the optical waveguide 110 is redirected through the optical coupling member 106 where it exits the window 200 and enters a corresponding window of a mating optical ferrule.

Also seen in this view is a ridge 202 that is configured to interface with a mating tongue of a mating optical ferrule. A second ridge (not shown in this figure) mirrors the ridge 202 about a longitudinal centerline of the optical coupling member 106. The dimensions of the ridges correspond to those of the mating tongue 104 such that the mating tongue of another, mating optical ferrule is aligned together with the illustrated ferrule 102. As will be shown in detail below, the ridges 202, mating tongue 104, stop surfaces 120 and mating surface 106a allow mating optical ferrule to align respective windows 200 without requiring, for example, significant longitudinal forces to be applied on the mating optical ferrules.

As seen in the view of FIG. 2, the optical ferrule 102 includes two stacking support members 116 located along opposing longitudinal edges of the optical coupling member 106. Note that only one of the longitudinal edges, edge 106b, is seen in this view. The two stacking members 116 (also referred to as "first and second stacking members") are mirror images of one another, e.g., mirrored across a plane formed by axes along the longitudinal and vertical directions 114, 118, the plane bisecting the optical coupling member 106.

Figure 3:
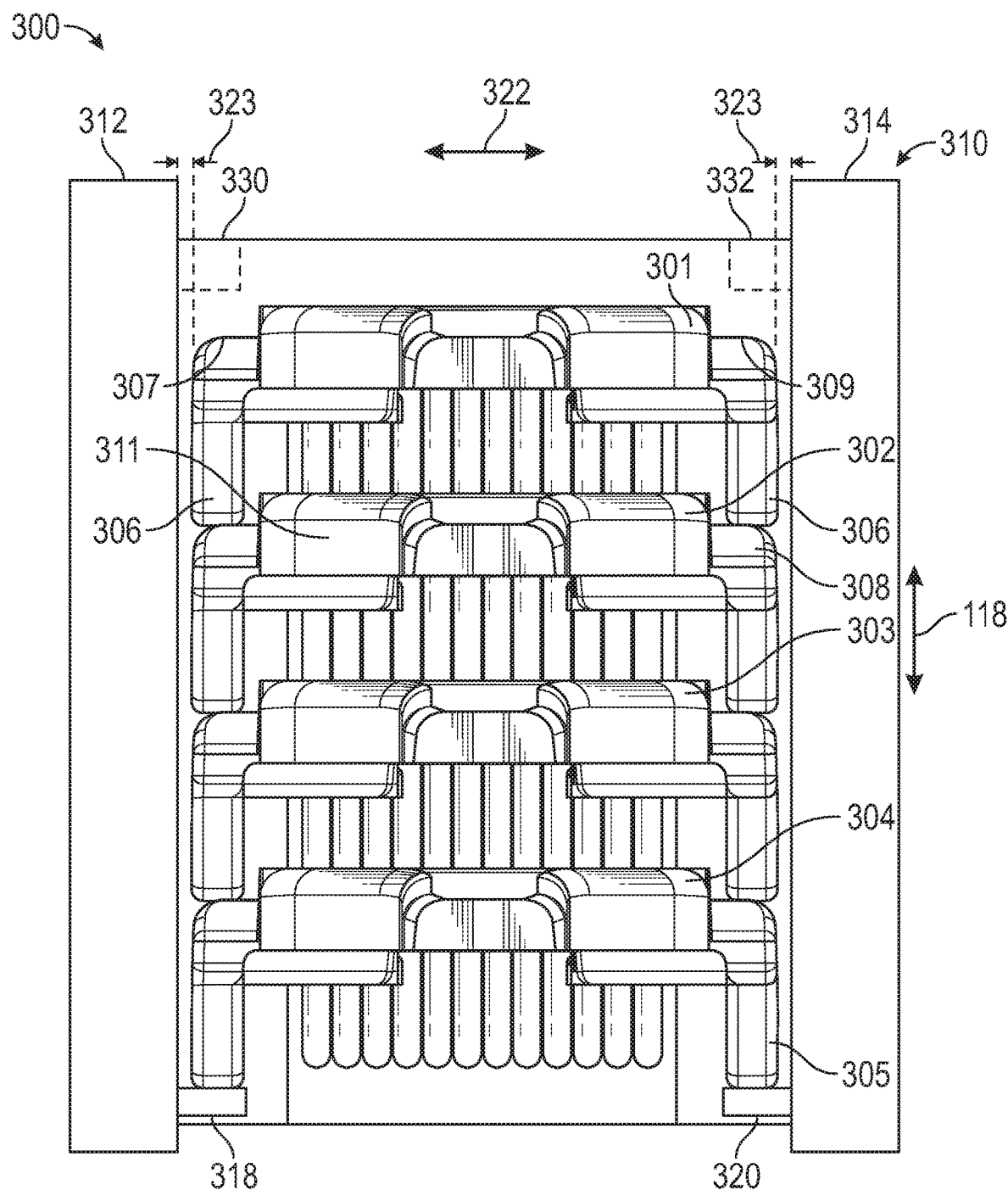
FIG. 3 is a front view of a connector according to an example embodiment.

In FIG. 3, a front view shows a connector 300 according to an example embodiment. The connector 300 includes four optical cable subassemblies 301-304 configured similarly to the optical cable subassembly 100 shown in FIGS. 1 and 2. Note that any number of optical subassemblies may be used. This figure uses the same convention for vertical orientation as was used in FIGS. 1 and 2, as indicated by arrow 118. As seen in this view, the stackable ferrules of the optical cable subassemblies 301-304 result in a vertical pitch of the ferrules being equal to the vertical pitch of the optical waveguide ribbons and cable retainers (see retainer 504 in FIG. 5) in the connector 300.

The optical cable subassemblies 301-304 are located between opposing walls 312, 314 of a housing 310. The optical ferrules of the subassemblies 301-304 are stacked one upon the other such that, in an unmated state of the connector 300, there is no intervening support (e.g., from housing 310) between adjacently stacked optical ferrules. A clearance 323 may be provided between interior surfaces of the opposing side walls 312, 314 and the ferrules of the optical cable subassemblies 301-304. This clearance 323 allows the side walls 312, 314 to restrain excessive movement of the optical ferrules in a side-to-side direction, as indicated by arrow 322, while still allowing for some freedom of movement by the ferrules. Also note that the extensions of the stacking support members also provide side-to-side alignment between stacked optical ferrules. For example, distal ends 306 of optical cable subassembly 301 straddle the optical coupling member 307 of optical cable subassembly 302. In order to support the stack of optical cable subassemblies 301-304 within the housing 310 in the vertical direction 118, ferrule supports 318, 320 extend from interior surfaces of the walls 312, 314.

While the housing 310 may include other members besides the side walls 312, 314 (e.g., top and/or bottom walls), the ferrule supports 318, 320 are attached or integral with the housing 310 may be the only members that provide vertical support for the stack of ferrules. In this example, the ferrule supports 318, 320 interface with the bottom ferrule's extensions. For example, extension 305 of optical cable subassembly 304 is shown contacting ferrule support 320. In other embodiments described herein, ferrule supports may be located and configured to contact other parts of the ferrules. For example, upper ferrule supports, as indicated by dashed outlines 330, 332, may serve to limit the upward motion of the ferrule stack by contacting surfaces 307 and 309.

Generally, the optical waveguides of the optical cable subassemblies 301-304 on both mating connectors are configured to flex within the housing 310, causing the ferrules to be at an angle to the housing 310 but parallel to each other. This angling involves rotating and sliding all of the adjacently stacked ferrules relative to one another, e.g., during manufacture of a connector that houses the subassemblies 301-304. Because the distal end of the stacking support member (e.g., distal end 306 of optical cable subassembly 301 shown in FIG. 3) is shaped to rotate and/or slide against the contact surface (e.g., contact surface 308 of subassembly 302) of an adjacent ferrule, the illustrated subassemblies 301-304 can achieve this rotation without any support members between adjacent ferrules. This allows the connector 300 to achieve a high density and simplifies subassembly of the connector 300.

Figure 4:
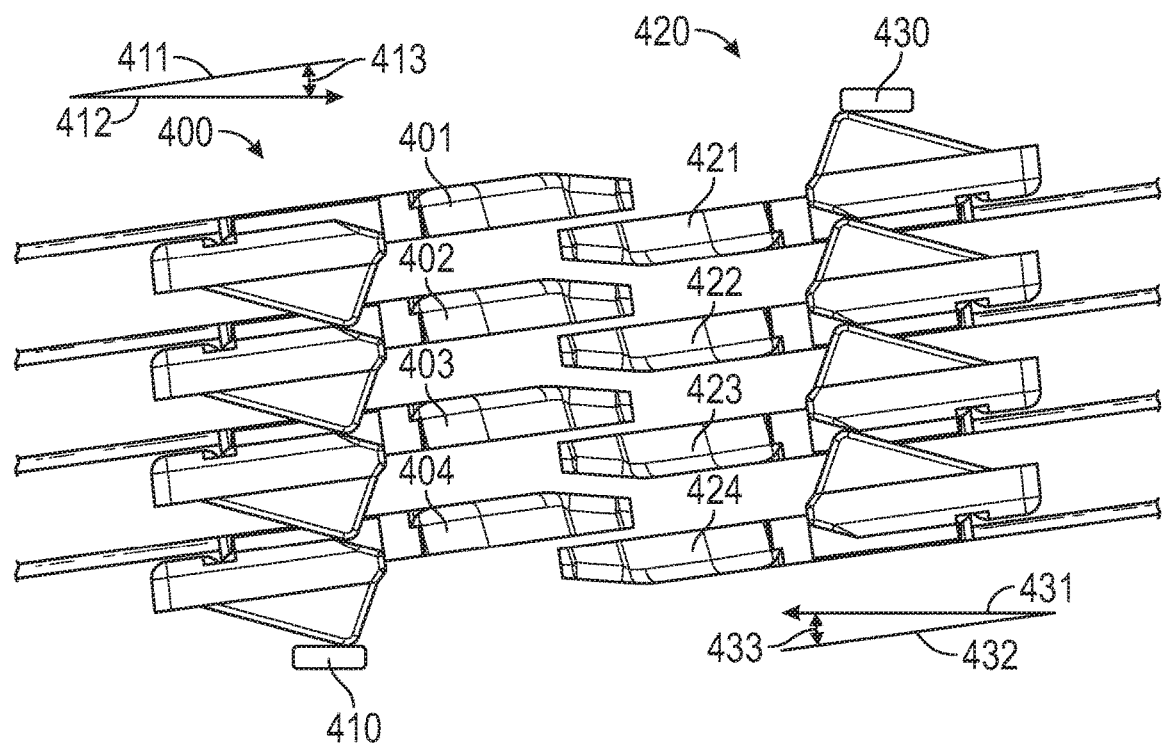
FIG. 4 is a side view of mating columns of optical cable subassemblies in an unmated configuration according to an example embodiment.

In FIG. 4, a side view illustrates two columns 400, 420 that respectively include ferrules 401-404 and 421-424 of mating optical cable subassemblies. These columns 400, 401 are part of mating connectors that each include a housing as shown in FIG. 3, although the housings are not shown in FIG. 4. The ferrules 401-404, 421-424 have substantially the same shape. Ferrules 401-404 of column 400 are inverted relative to ferrules 411-414 of column 420, such that the respective mating surfaces of a pair of mating ferrules are facing each other. The ferrules 401-404, 411-414 are hermaphroditic, meaning they can be made from the same mold and do not require differing features, e.g., as with male/female connectors.

Ferrule support members 410, 430 are integral with or attached to the respective housings that enclose columns 400, 401. In this figure, the ferrules 401-404 and 421-424 are in an unmated configuration, shown just before or after being mated with one another. Mating the ferrules 401-404 and 421-424 involves moving one or both of the columns in respective directions indicated by arrows 411, 431. The arrows 411, 431 are generally aligned with a longitudinal direction of the housing. Lines 412, 432 represent the longitudinal directions of the ferrules 401-404, 421-424, which are generally parallel. The longitudinal directions 412, 432 are at approximately equal acute angles 413, 433 with respect to the longitudinal direction of the housing. The orientation of the ferrules 401-404, 421-424 at the acute angles 413, 433 as opposed to aligned with the longitudinal directions 411, 431 of the housings results in opposing forces being applied that are normal to the mating surfaces of the ferrules 401-404, 421-424. These normal forces help ensure positive mechanical engagement between the mating surfaces of the ferrules 401-404, 421-424, as well as other alignment features included with the ferrules 401-404, 421-424 (e.g., mating tongue 104 and ridge 202 as seen in FIG. 2). Note that the acute angles 413, 433 change during mating as the ferrules rotate, resulting in bending of the fibers, and thereby increasing the normal force.

Figure 5:
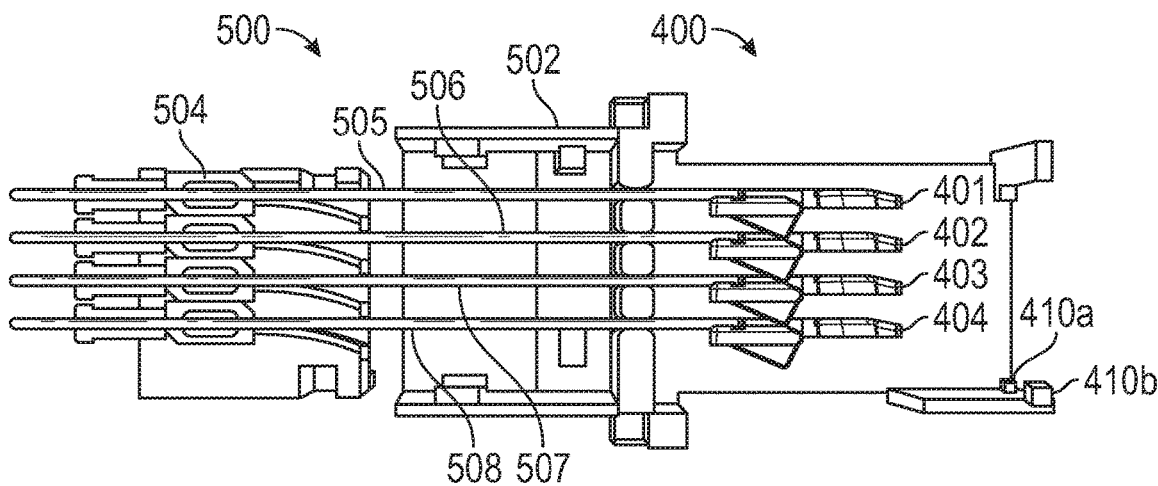
FIGS. 5 and 6 are side views of a connector according to an example embodiment.

In FIG. 5, the column 400 of FIG. 4 is shown in housing 502 of optical connector 500. The housing 502 is shown cut away along a center-plane in this view. Note that two ferrule support members 410a-b are shown, one support member 410a being attached to/integrated with the illustrated half of the housing 502 and the other support member 410b shown "floating" to facilitate understanding of the interaction between the ferrules 401-404 and the support members 410a-B. This illustration in FIG. 5 shows optical connector subassemblies of the column before being finally assembled into the housing 502. A cable retainer 504 is shown attached to the optical waveguides 505-508 of the subassemblies.

Figure 6:
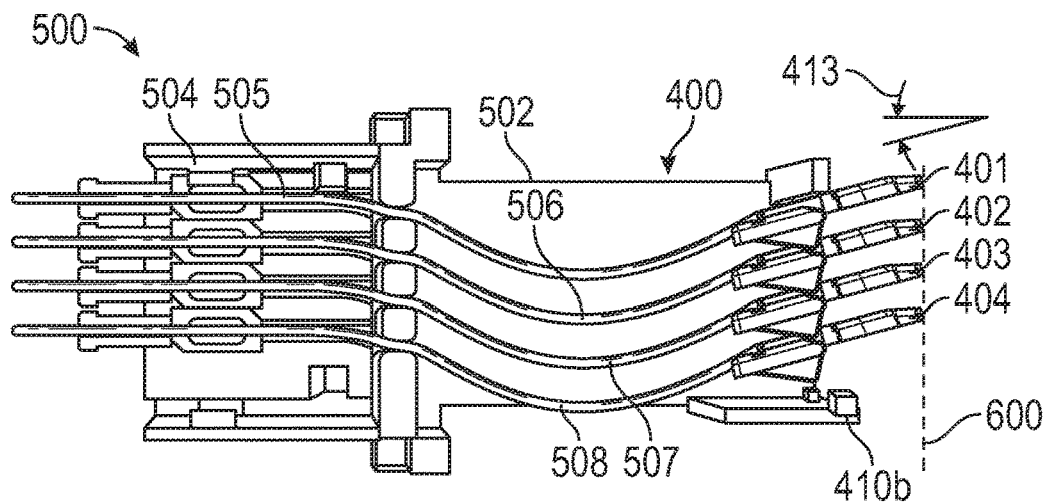

As shown in FIG. 6, the cable retainer 504 is slidably inserted into the housing, causing a bend in the optical waveguides 505-508 and causing the ferrules 401-404 to be oriented at the acute angle 413 with respect to the housing 502. The extensions of ferrules 401-403 are pressed against, slide and/or rotate relative to the contact surfaces of respective lower adjacent stacked ferrules 402-404. The extensions of ferrule 404 are pressed against, slide, and/or rotate relative to the ferrule support members 410a-b. Note that the sliding and/or rotation of adjacently stacked ferrules 401-404 against each other or against the ferrule support members 410a-b allows the ends of the ferrules to 401-404 to be vertically aligned as they are angled, as indicated by vertical line 600.

The bending of the waveguides 505-508 due to sliding of the cable retainer 504 results in a force being applied to the ferrules 401-404 in an unmated configuration, causing the column of ferrules 401-404 to be pressed against the ferrule support members 410a-b. Note that in this configuration/state only the bottom ferrule 404 is directly supported by the ferrule support members 410a-b that are attached to or integral with the housing 502. The other ferrules 401-403 are supported by the immediately adjacent ferrule and not directly supported by the housing 502. When the ferrules 401-404 are mated with ferrules of another connector, this spring force applied by the bending of the waveguides 505-508 is transferred to mating surfaces of the mating ferrules, causing the ferrules 401-404 to be lifted off of the support members 410*a-b* and also causing separation between extensions and contact surfaces of adjacent ferrules 401-404.

Figure 7:
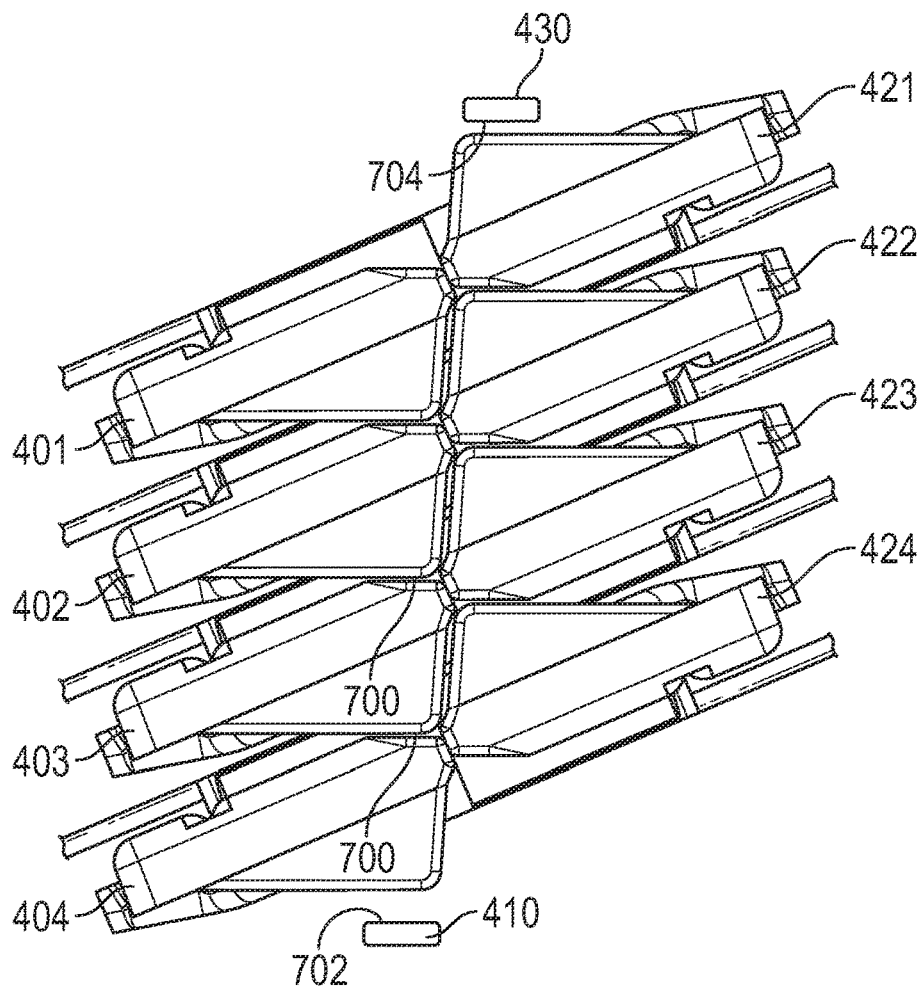
FIG. 7 is a side view of mating columns of optical cable subassemblies in a mated configuration according to an example embodiment.

In FIG. 7, a side view shows ferrules 401-404, 421-424 in a mated configuration. In this configuration, the windows on the mating surfaces of the ferrules 401-404, 421-424 are facing each other and aligned such that light is coupled therebetween. Note that in the mated configuration, gaps 700 exist between respective extensions and contact surfaces of adjacent ferrules. These gaps 700 are due to the spring forces formerly being applied between ferrule extensions and ferrule contact surfaces to be shifted such that the forces are instead applied between the mating surfaces of the ferrules 401-404, 421-424, resulting in separation between extensions and contact surfaces of adjacent ferrules. Similarly, gaps 702, 704 exist between support members 410, 430 and respective extensions of ferrules 404, 421. The gaps 700, 702, 704 in the mated configuration help ensure that the spring force applied by the optical waveguide fibers is fully applied between the mating surfaces of the ferrules 401-404, 421-424 and not lessened due to full or partial contact with the support members 410, 430 or with other ferrules.

Figure 8:
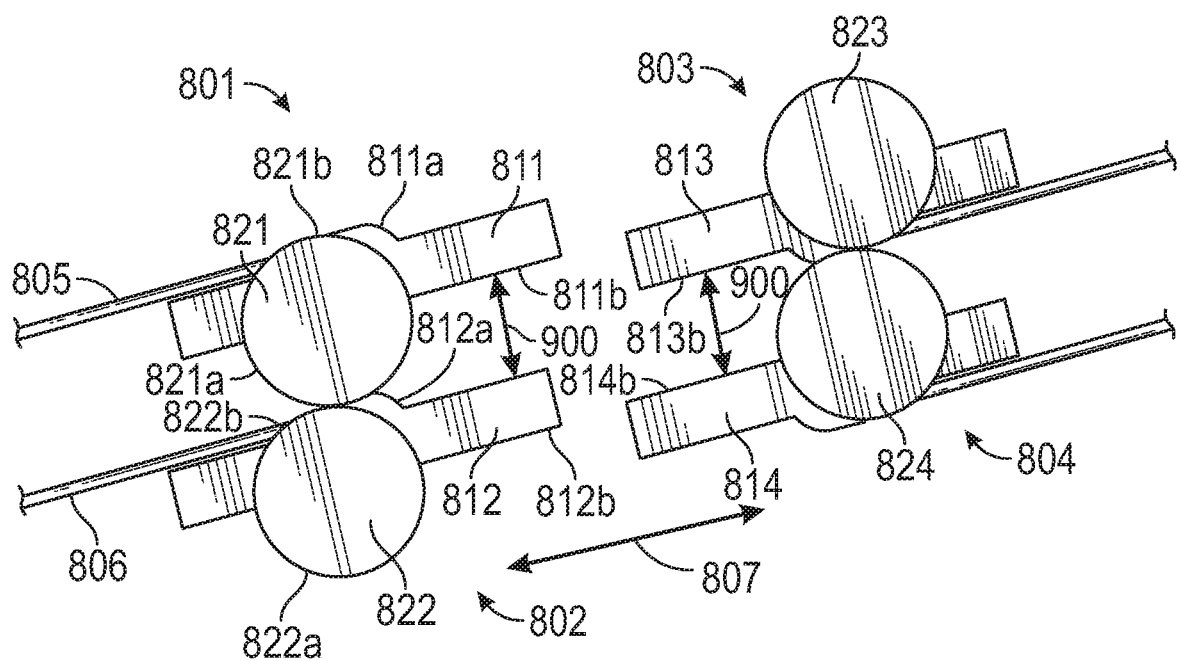
FIG. 8 is a side view of mating optical ferrules in an unmated configuration according to another example embodiment.
Figure 9:
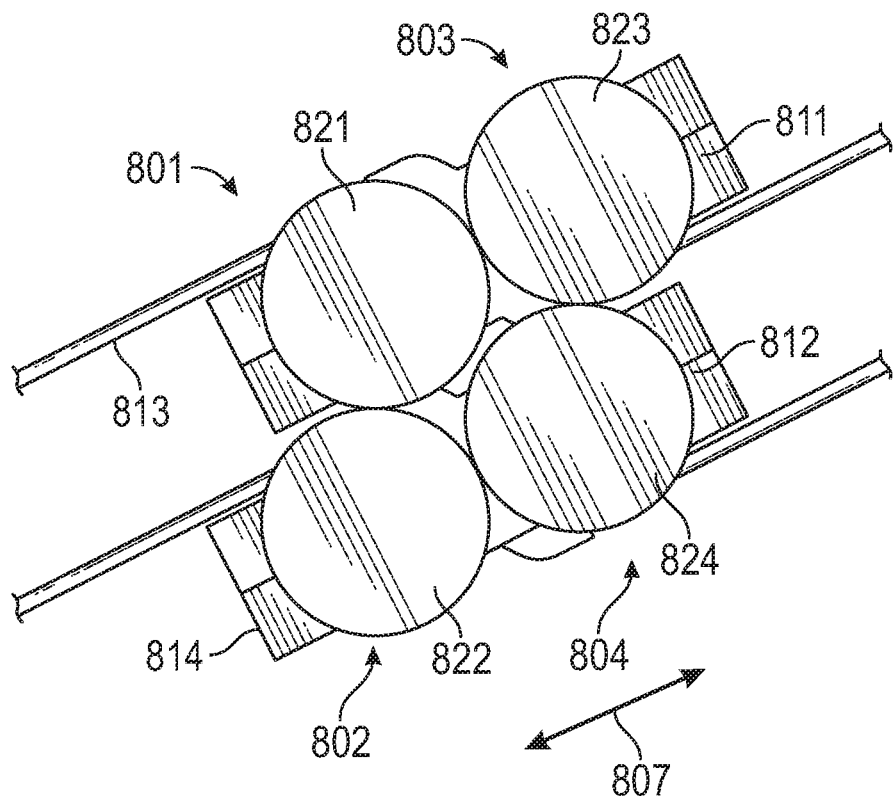
FIG. 9 is a side view of the ferrules of FIG. 8 in a mated configuration.

In FIGS. 8 and 9, side views show ferrules 801-804 according to another example embodiment. Ferrules 801, 802 are part of a first optical connector and ferrules 803, 804 are part of a second optical connector that mates with the first optical connector. Ferrules 801, 802 include optical coupling member 811, 812. The optical coupling members 811, 812 include light redirecting elements 811*a*, 812*a* configured to redirect input light from waveguide arrays 805, 806 attached to the optical coupling members 811, 812. The optical coupling members 811, 812 include mating surfaces 811*b*, 812*b* with output windows (not shown). The mating surfaces 811*b*, 812*b* are configured to slidably mate with mating surfaces 813*b*, 814*b* of mating optical coupling members 813, 814 along a longitudinal axis 807 of the optical ferrules.

Each of the optical ferrules 801, 802 includes at least one stacking member 821, 822 along a longitudinal edge of the optical coupling members 811, 812. The stacking members 821, 822 include distal ends 821*a*, 822*a* extending beyond the mating surfaces 811*b*, 812*b* and contact surfaces 821*b*, 822*b* opposed to the distal ends 821*a*, 822*a*. The contact surface 822*b* is configured to slidably and/or rotatably interface with corresponding distal end 821*a* of a corresponding stacking support member 821 of adjacently stacked optical ferrule 801. The optical ferrules 803, 804 of the second optical connector also include similarly configured stacking members 823, 824. The stacking members of ferrules 801 are sufficiently large to provide a gap 900 between ferrules 801 and 802 to allow ferrule 803 to mate with ferrule 801 without colliding with ferrule 802.

Note that in these embodiments, the stacking members 821, 822 have circular shape, such that the distal ends 821*a*, 822*a* and contact surfaces 821*b*, 822*b* are respective first and second segments of the respective circles. The ferrules 801-804 are shown in an unmated configuration in FIG. 8, and shown in a mated configuration in FIG. 9. Note that in the mated configuration, there is no gap in the longitudinal direction 807 between the respective stacking members 821-824. In one embodiment, contact between stacking members of mating ferrules (e.g., between members 821 and 823, between 822 and 824) can serve as stops that position the optical coupling members 811-814 relative to one another in the ferrule's longitudinal direction 807. In other embodiments, the stacking members 821-824 can be positioned such that there is no longitudinal contact, and other features (e.g., ridges 202 in FIG. 2) can be used to provide this alignment.

Figure 10:
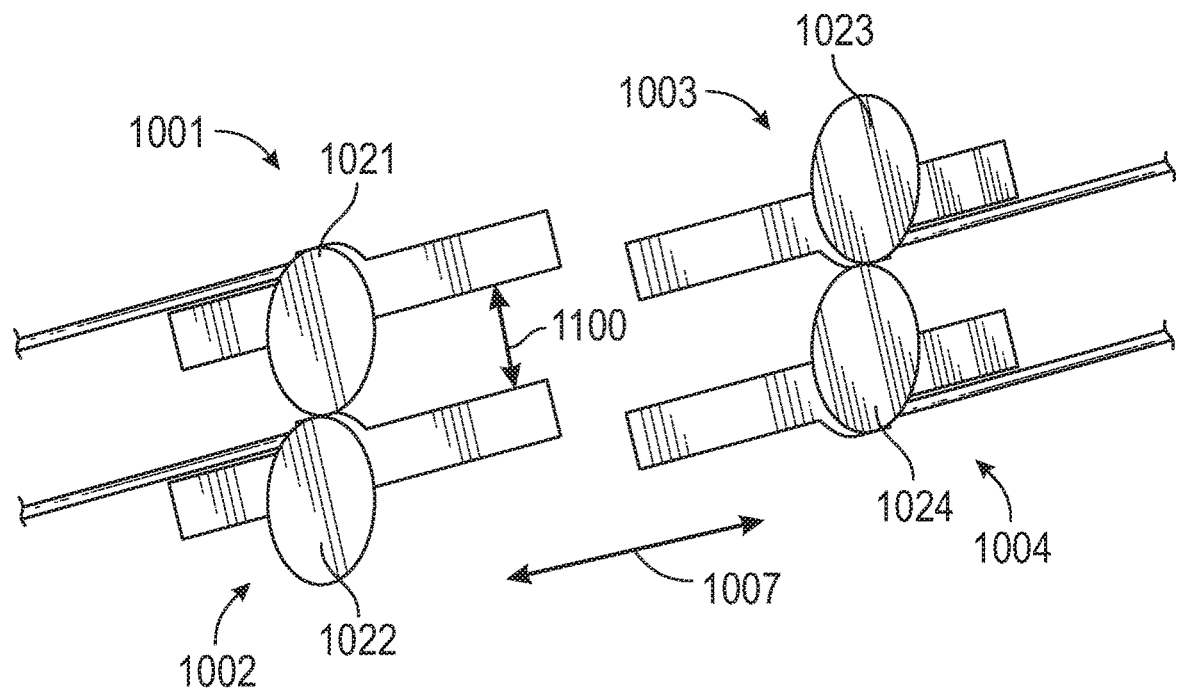
FIG. 10 is a side view of mating optical ferrules in an unmated configuration according to another example embodiment.
Figure 11:
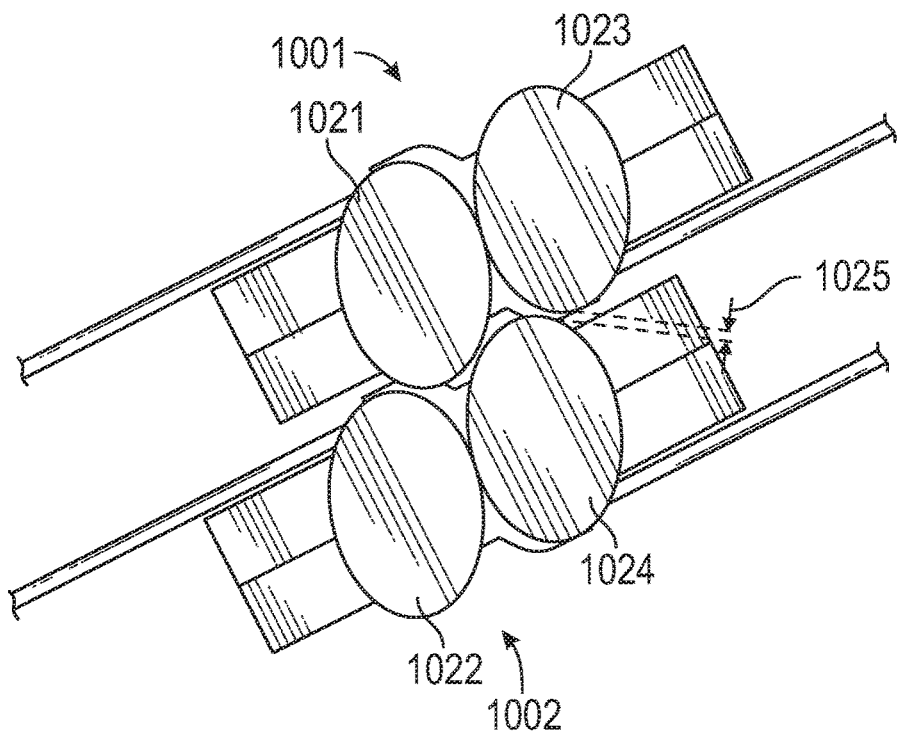
FIG. 11 is a side view of the ferrules of FIG. 10 in a mated configuration.

In FIGS. 10 and 11, side views show ferrules 1001-1004 according to another example embodiment. The unmated configuration of ferrules 1001-1004 is shown in FIG. 10 and the mated configuration is shown in FIG. 11. The ferrules 1001-1004 are configured similarly to the embodiment shown in FIGS. 8 and 9, except that the ferrules 1001-1004 include elliptical stacking members 1021-1024. Thus, the contact surfaces and extensions of the stacking members 1021-1024 are elliptical sections. As with the previous embodiment, the major and minor axes of the stacking members 1021-1024 can be sized to reduce/increase stacking gap 1100 and to cause contact between the stacking members 1021-1024 of mating ferrules 1001-1004 in the longitudinal direction 1007. In this embodiment, the stacking members of each mated ferrule are no longer in contact with the adjacent ferrules in its stack. The separation 1025 is caused by the rotation of the ferrules during the mating process.

Figure 12:
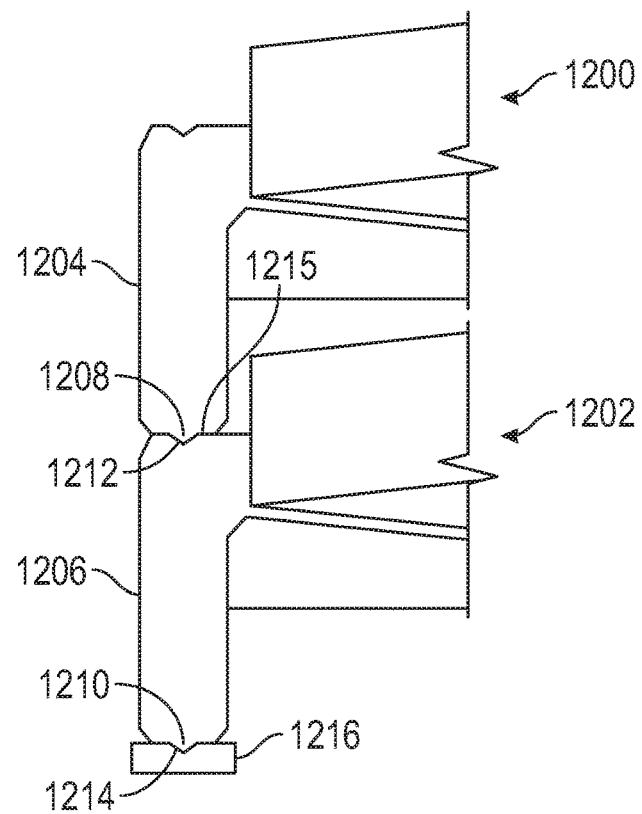
FIGS. 12 and 13 are front views of optical ferrules showing alignment features according to other example embodiments.

In FIG. 12, a front view shows stacking members 1204, 1206 extending from sides of optical ferrules 1200 1202 according to one embodiment. Distal end of stacking member 1204 includes a ridge 1208 that aligns with and fits into groove 1212 on contact surface 1215 of ferrule 1202. Distal end of stacking member 1206 includes a ridge 1210 that aligns with and fits into groove 1214 of ferrule support 1216. The ridges 1208, 1210 and grooves 1212, 1214 facilitate maintaining side-to-side alignment of the ferrules 1200, 1202 in an unmated configuration such that a column formed by the stacked ferrules 1200, 1202 will more easily mate with a corresponding ferrule column that uses similar alignment features. While the illustrated ridges 1208, 1210 and grooves 1212, 1214 have a triangular, or V-shape, any suitable shape may be used, including circular, elliptical, square, etc. It is also possible that grooves and ridges have different shapes, e.g., a V-shaped ridge that fits into a rectangular groove. Note that the grooves and ridges may be sized such that the separation of stacking members from contact surfaces in the mated configuration will lift the ridges 1208, 1210 out of the grooves 1212, 1214. As a result, small misalignments between the ridges 1208, 1210 and the grooves 1212, 1214 should not affect optical alignment between mating ferrules in the mated configuration.

Figure 13:
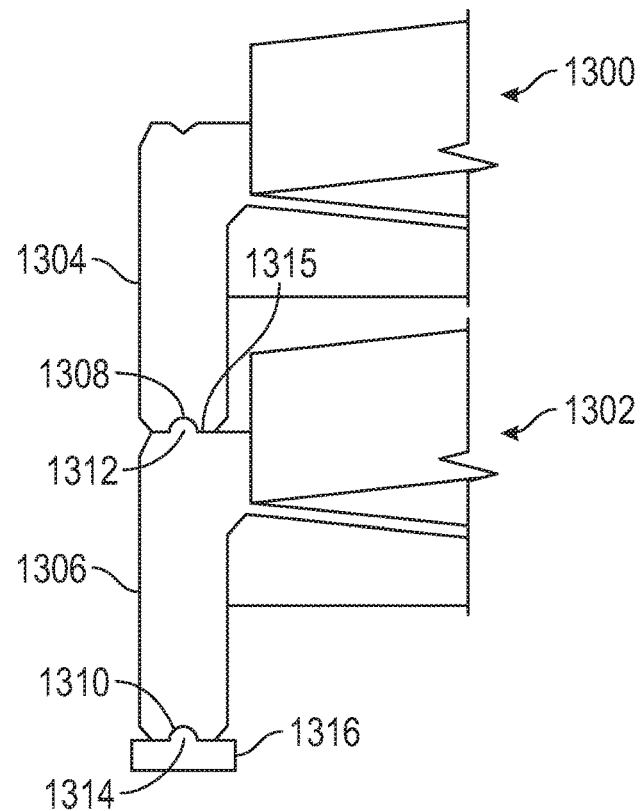

In FIG. 13, a front view shows stacking members 1304, 1306 extending from optical ferrules 1300 1302. Distal end of stacking member 1304 includes a groove 1308 that aligns with and fits around ridge 1312 on contact surface 1315 of ferrule 1302. Distal end of stacking member 1306 includes a groove 1310 that aligns with and fits around ridge 1314 of ferrule support 1316. The ridges 1312, 1314 and grooves 1308, 1310 operates similarly to like named components in FIG. 12, and may include different shapes as described in that embodiment.

Figure 14:
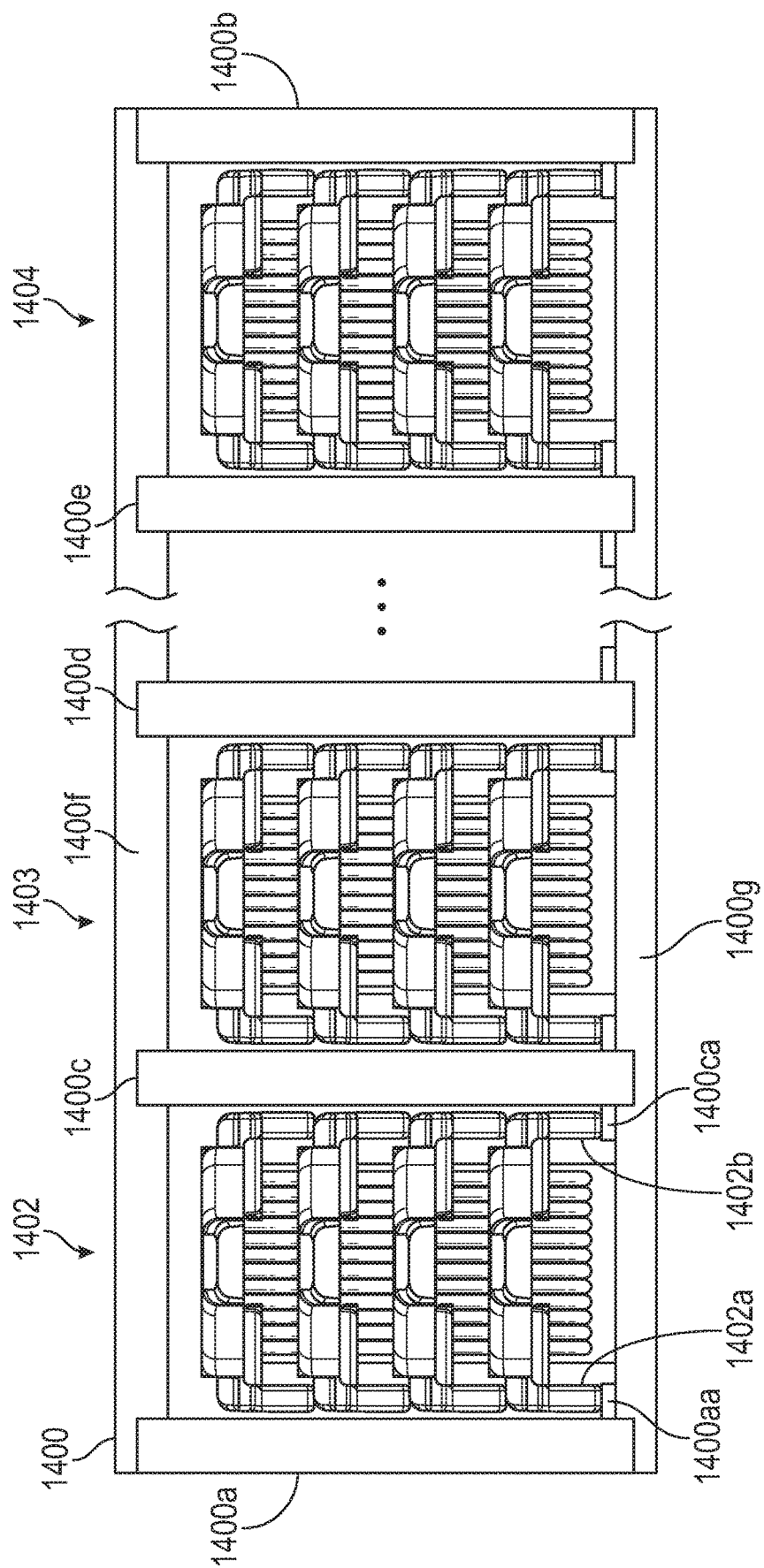
FIG. 14 is a front view of a multiple-column optical connector according to an example embodiment.

In the embodiments shown above, an optical connector includes a housing and at least one column of one or more sets of adjacent optical cable assemblies disposed in the housing. The optical cable assemblies include a ferrule according to various embodiments described above, as well as optical waveguides (e.g., optical fiber ribbons) coupled to the ferrules. This concept can be extended to multiple adjacent columns in some embodiments, as seen in the front view of FIG. 14. A housing 1400 includes outer sidewalls 1400a-b and inner sidewalls 1400c-e. Two or more columns 1402-1404 of optical cable assemblies are located between respective sidewalls 1400a-e. The optical cable assemblies within the columns 1402-1404 may be configured with ferrules and waveguides according to any of the embodiments described herein.

Each of the columns 1402-1404 may be supported by a one or more ferrule supports, as indicated by ferrule supports 1400aa and 1400ca that extend respectively from sidewalls 1400a and 1400c. Distal ends of one set of ferrule extensions (e.g., extensions 1402a-b of column 1402) ride against the ferrule supports. As in previous embodiments, alternate ferrule supports can be provided on the enclosure 1400 instead of or in addition to the illustrated supports (e.g., supports 330, 332 shown in FIG. 3). Similarly, in this and other embodiments, a single ferrule support can span the width of one more columns such that it supports two or more extensions from bottom ferrules. Also seen in this view are top and bottom walls 1400F-G of the enclosure 1400, which are at a non-zero angle to (e.g., 90-degree angle) and join at least the outer sidewalls 1400a-b. As shown, the top and bottom walls 1400f-g also join the inner sidewalls 1400c-e.

Figure 15:
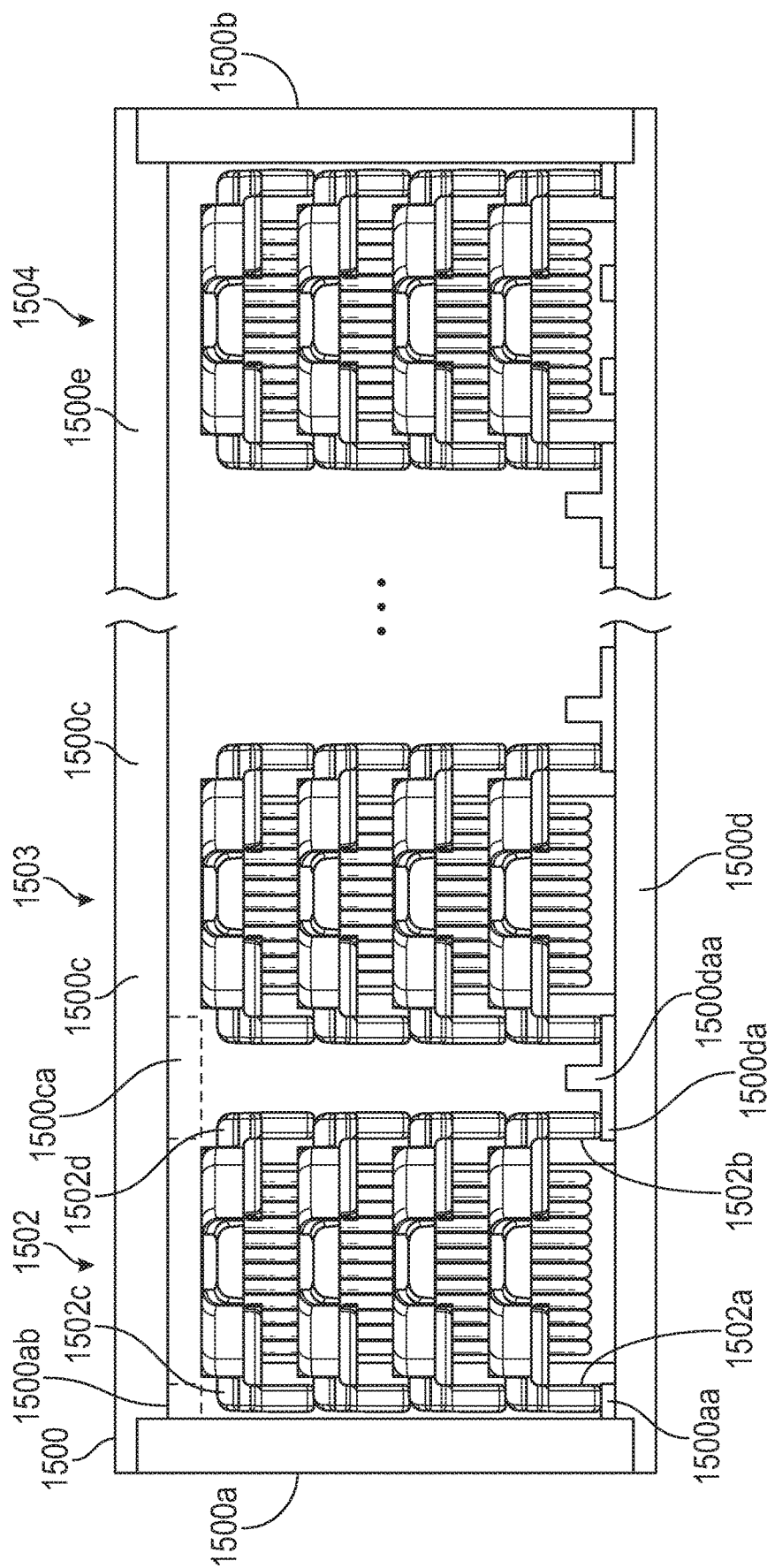
FIG. 15 is a front view of a multiple-column optical connector according to another example embodiment.

In FIG. 15, a front view shows an arrangement of an optical connector with multiple adjacent columns according to another example embodiment. A housing 1500 includes outer sidewalls 1500a-b and top and bottom walls 1500c-d that are at a non-zero angle to (e.g., 90-degree angle) and that join the sidewalls 1500a-b. Two or more columns 1502-1504 of optical cable assemblies are located between the sidewalls 1500a-b. The optical cable assemblies within the columns 1502-1504 may be configured with ferrules and waveguides according to any of the embodiments described herein. Each of the columns 1502-1504 may be supported by a pair of ferrule supports, as indicated by ferrule support 1500aa that is proximate to (and may extend from) from sidewall 1500a. Ferrule support 1500da extends from the bottom wall 1500d, and may optionally include a protrusion 1500daa that separates adjacent columns 1502, 1503. Distal ends of one set of ferrule extensions (e.g., extensions 1502a-b of column 1502) ride against the ferrule supports 1500aa, 1500da. The housing 1500 may include side supports 1500ab, 1500ca that extend from the top wall 1500c (side support 1500ab may in addition or instead extend from the sidewall 1500a). These alternate side supports 1500ab, 1500ca may ride against the optical coupling members of the ferrules (e.g., against vertical surfaces that intersect contact surfaces 1502c-d of column 1502) to prevent excessive side-to-side movement of the columns 1502-1504.

Optical ferrules as described above can be formed as unitary, molded structures. Some embodiments described herein involve molded optical ferrules and molds for making optical ferrules. Molding ferrules involves the use of two primary mold parts which are referred to herein as the "first mold side" and the "second mold side". The first mold side includes first mold features configured to mold a first set of the features of the optical ferrule. The second mold side includes second mold features configured to mold a second set of the features of the optical ferrule. When the mold is operated, the two halves are brought together along what is referred to herein as the "parting axis", the first side and the second side define a cavity for molding a unitary optical ferrule. A moldable material is injected or otherwise placed into the cavity and hardens, e.g., due to cooling of the mold material, to form the unitary ferrule. The mold halves are then separated along the parting axis to allow the ferrule to be removed. Some materials useful for molded ferrules include thermoplastic and thermosetting polymers, ceramics, metals, glasses, etc.

The error in alignment of the mold sides can be significant, e.g., on the order of about 10 μm or more. In reference again to FIGS. 1 and 2, if the attachment area 112, the light-redirecting element 108, and mechanical alignment features (e.g., mating tongue 104) are not molded by a single side of the mold, the attachment area 112 and the light-redirecting element 108 may be misaligned with the alignment features. When such a defective ferrule is mated with a mating ferrule, the alignment features cause the optical transmission elements to be improperly aligned with the mating ferrule, thereby increasing the optical insertion loss of the connector. As such, the ferrule-to-ferrule alignment features (e.g., tongue 104, ridges 202, and stops 120 shown FIG. 2) can be formed on the same side of the mold with the optical features such as the light redirecting element 108 and attachment area 112 to ensure accurate alignment even if the mold sides are misaligned. Because the stacking members 116 will not affect to the optical alignment of mated ferrules, it is possible to mold them on the other side of the mold than the optical features even if the other side of the mold is misaligned.

Figure 16:
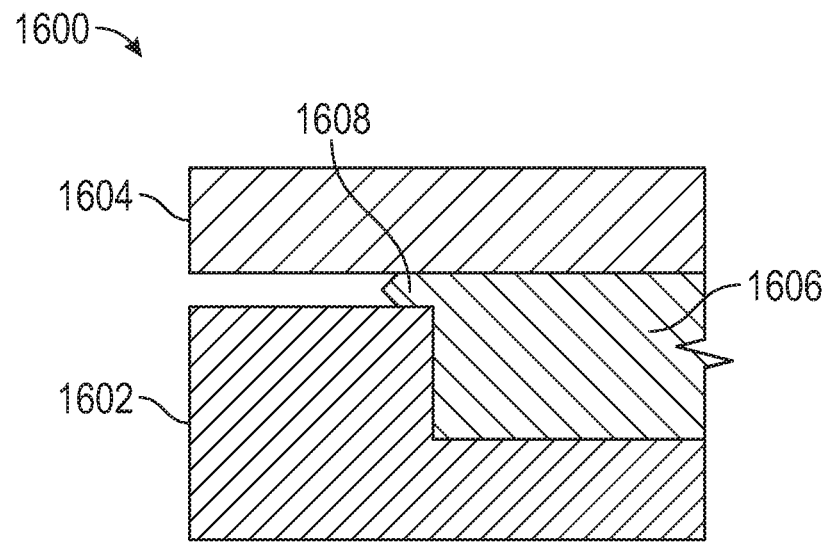
FIGS. 16 and 17 are cross-sectional views of mold parts and molding artifacts according to an example embodiment.
Figure 17:
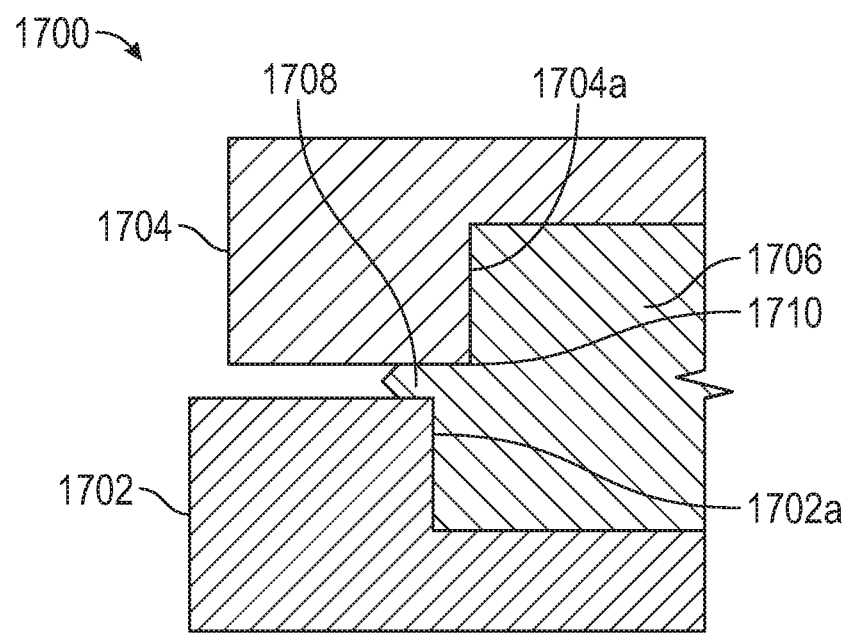

In FIGS. 16 and 17, cross-sectional views show molds used to form a unitary ferrule according to an example embodiment. Mold 1600 in FIG. 16 has first 1602 and second 1604 sides, with molded material 1606 between the first and second mold sides 1602, 1604. A parting line flash artifact 1608 occurs where the molded material 170 penetrates a small gap between the mold sides 1602, 1604. Mold 1700 in FIG. 17 has first 1702 and second 1704 sides, with molded material 1706 between the first and second mold sides 1702, 1704. A flash parting line artifact 1708 occurs where the mold material 190 penetrates a small gap between the mold sides 1702, 1704. A step parting line artifact 1710 occurs where the second side 1704 of the mold includes a vertical wall 1704a that is slightly misaligned with the vertical wall 1702a of the first side and the molded material penetrates a small gap between mold sides 1702, 1704.

Figure 18:
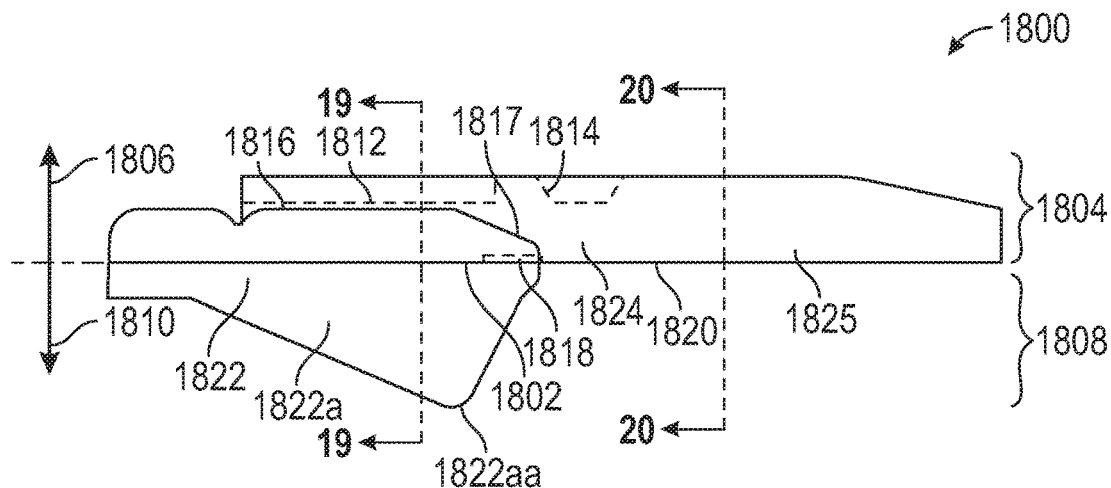
FIG. 18 is a side view of a unitary, molded, optical ferrule according to an example embodiment.

In FIG. 18, a side view shows a molded unitary optical ferrule 1800 according to an example embodiment. The ferrule 1800 includes one or more parting line artifacts 1802. At least one of the parting line artifacts 1802 extending substantially around an external perimeter of the optical ferrule 1800. The parting line artifacts 1802 divide a surface of the optical ferrule 1800 into a first section 1804 along a first direction 1806 of a thickness axis and an opposing second section 1808 along a second direction 1810 of the thickness axis.

The first section 1804 includes one or more elements 1812 configured to receive and secure an optical waveguide, such as grooves, supports, etc. (see FIG. 1, for example). The first section 1804 also includes one or more elements 1814 configured to redirect input light within the unitary optical ferrule 1800. The elements 1814 may include mirrors, lenses, internal waveguides, etc. A stacking contact surface 1816 and angled front 1817 is also included with the first section 1804, as well as a mating tongue 1825.

The second section 1808 includes at least one output window 1818 configured to transmit the redirected light out of a mating surface 1820. The mating surface 1820 may also be considered part of the second section 1808. The second section 1808 further includes at least one stacking support member 1822 along a longitudinal edge 1824 of the optical ferrule 1800. The at least one stacking member 1822 includes an extension 1822a having a distal end 1822aa extending beyond the mating surface 1820. The distal end 1822aa is configured to rotatably interface with a contact surface of a corresponding stacking support member.

Note that in this example, the parting line artifact 1802 is located at an intersection between longitudinal sides 1824 and the mating surface 1820. Also, the parting line artifact 1802 extends along an outward facing surface of the stacking support member 1822. In other embodiments, parting line artifacts may extend along an edge of the extensions 1822, e.g., where two surfaces of extensions 1822 meet. This is shown in the following figures with illustrates example molding parts used to form the ferrule 1800.

Figure 19:
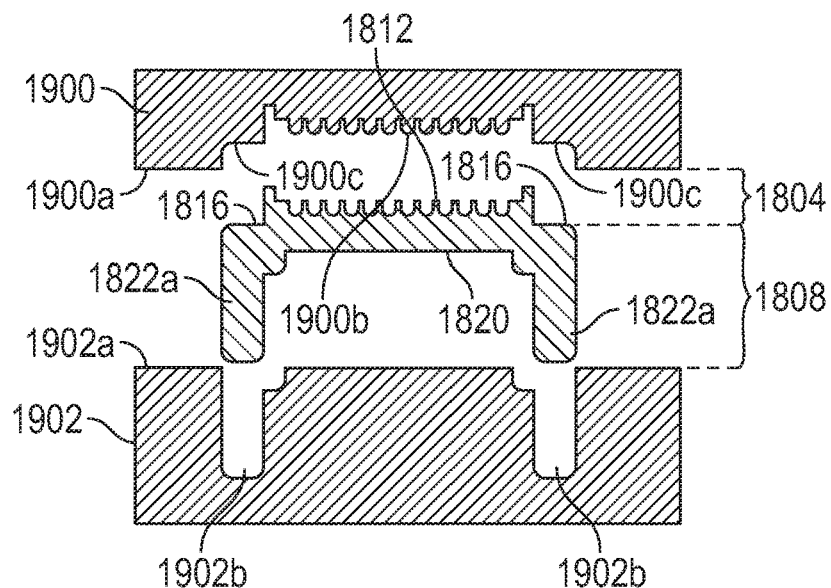
FIGS. 19 and 20 are cross-sectional views of molds used to form ferrules according to example embodiments.
Figure 20:
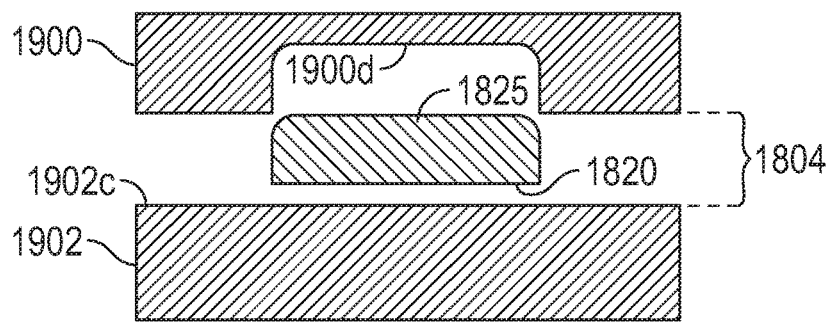

In FIGS. 19 and 20, cross-sectional views show first and second parts 1900, 1902 of a mold used to form the optical ferrule 1800 shown in FIG. 18. The view of FIG. 19 corresponds to Section 19-19 through the ferrule 1800 shown in FIG. 18, and illustrates details of the elements 1812 configured to receive and secure optical waveguides that are formed by mold feature 1900b. Also seen in FIG. 19 are extensions 1822a and stacking contact surfaces 1816 on opposing longitudinal edges of the ferrule, and corresponding features 1902b, 1900c of mold parts 1902, 1900 used to form these features. Note that the intersection between surfaces 1900a, 1902a of the mold parts 1900, 1902 results in the parting line artifact 1802 shown in FIG. 18. The view of FIG. 20 corresponds to Section 20-20 through the ferrule 1800 shown in FIG. 18, and illustrates details of the mating tongue 1825 and features 1900d and 1902c used to form the tongue 1825.

Figure 21:
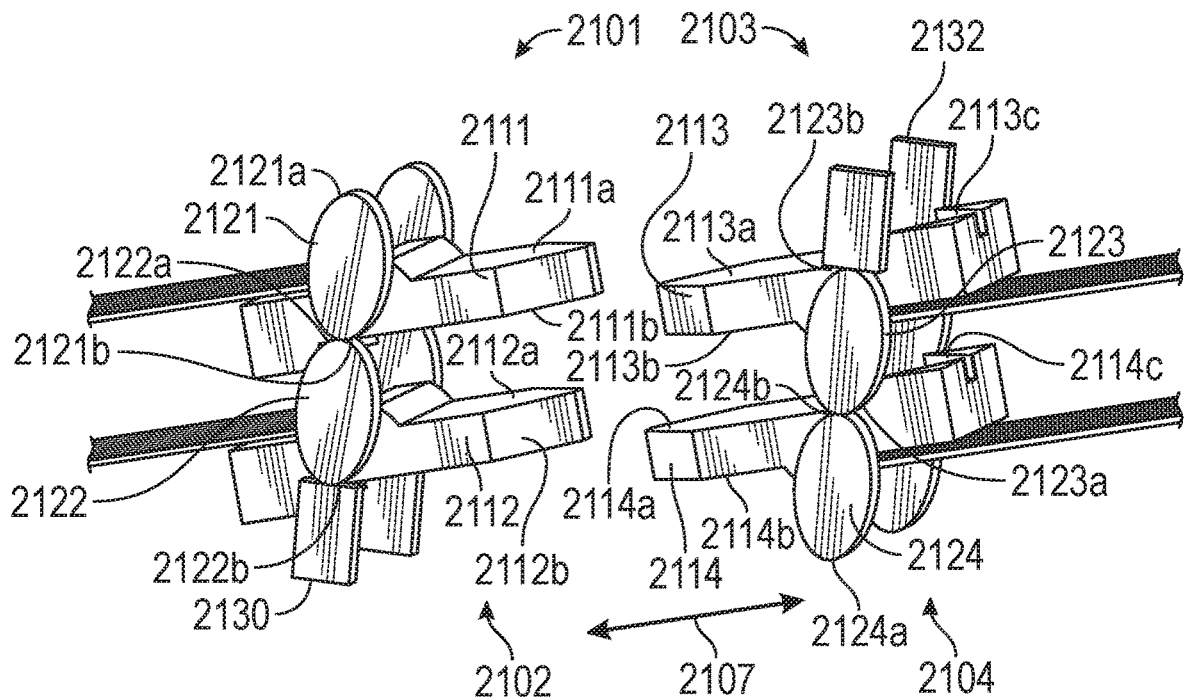
FIGS. 21 and 22 are perspective views of ferrules according to another example embodiment in unmated and mated configurations.
Figure 22:
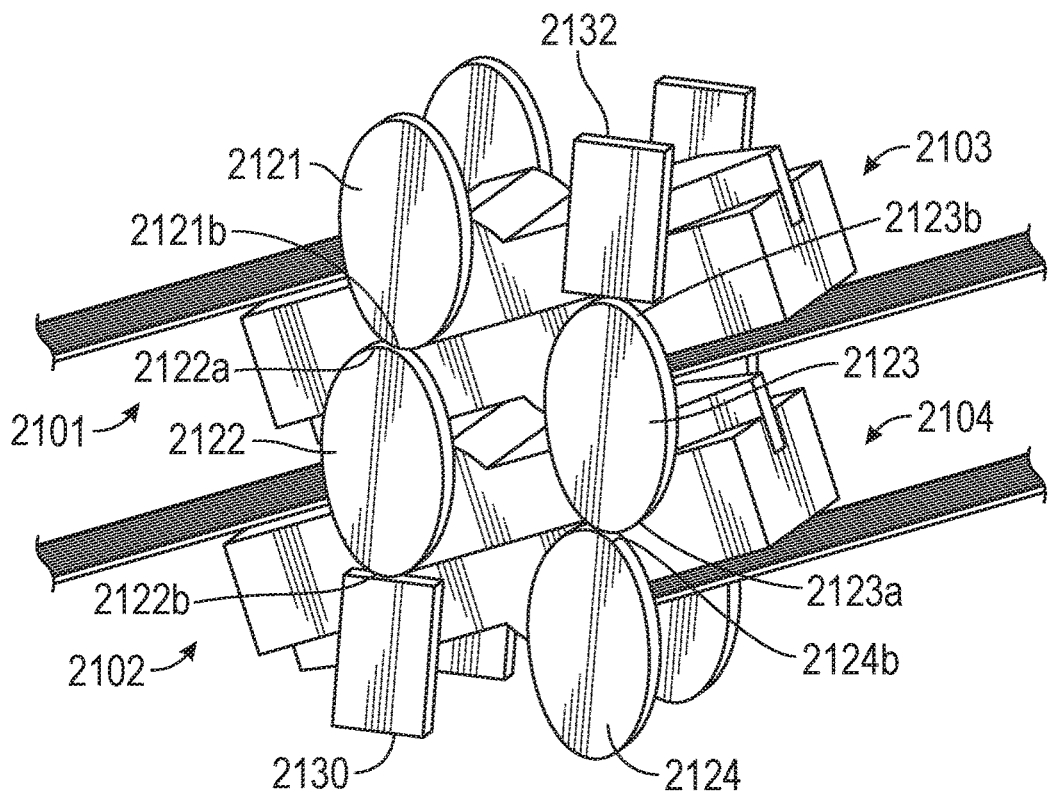

In FIGS. 21 and 22, perspective views show ferrules 2101-2104 according to another example embodiment. The unmated configuration of ferrules 2101-2104 is shown in FIG. 21 and the mated configuration is shown in FIG. 22. The ferrules 2101-2104 include elliptical stacking members 2121-2124 having distal ends 2121a-2124a extending beyond top surfaces 2111a-2114a of optical coupling members 2111-2114. The top surfaces 2111a-2114a are opposed to mating surfaces 2111b-2114b of the optical coupling members 2111-2114. Contact surfaces 2121b-2124b of the stacking members 2121-2124 may be recessed below, be aligned with, or extend beyond the mating surfaces 2111b-2114b.

Two of the contact members 2122b, 2123b are shown riding against ferrule support members 2130, 2132 in the unmated configuration shown in FIG. 21. As with other embodiments, the ferrule support members 2130, 2132 are attached to a connector housing or other connector support. In the mated configuration shown in FIG. 22, the contact members 2122b, 2123b are lifted away from the ferrule support members 2130, 2132. Additionally in the unmated configuration, the distal ends 2122a and 2123a are lifted off of respective adjacent contact members 2121b, 2124b. Also note in the unmated configuration that the optical coupling members 2111-2114 have ridges extending from the top surfaces that (see ridges 2113c and 2114c in FIG. 21 extending from top surfaces 2113a, 2114a) act as stop/alignment features in the longitudinal direction 2107.

Figure 23:
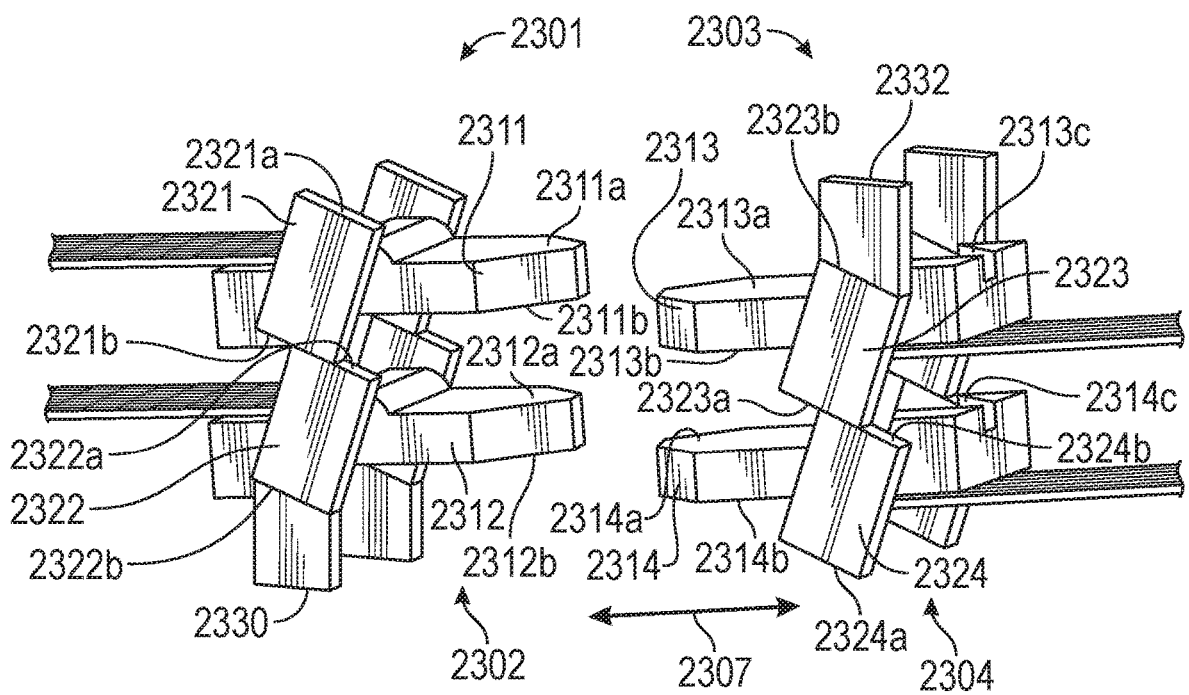
FIGS. 23 and 24 are perspective views of ferrules according to another example embodiment in unmated and mated configurations.
Figure 24:
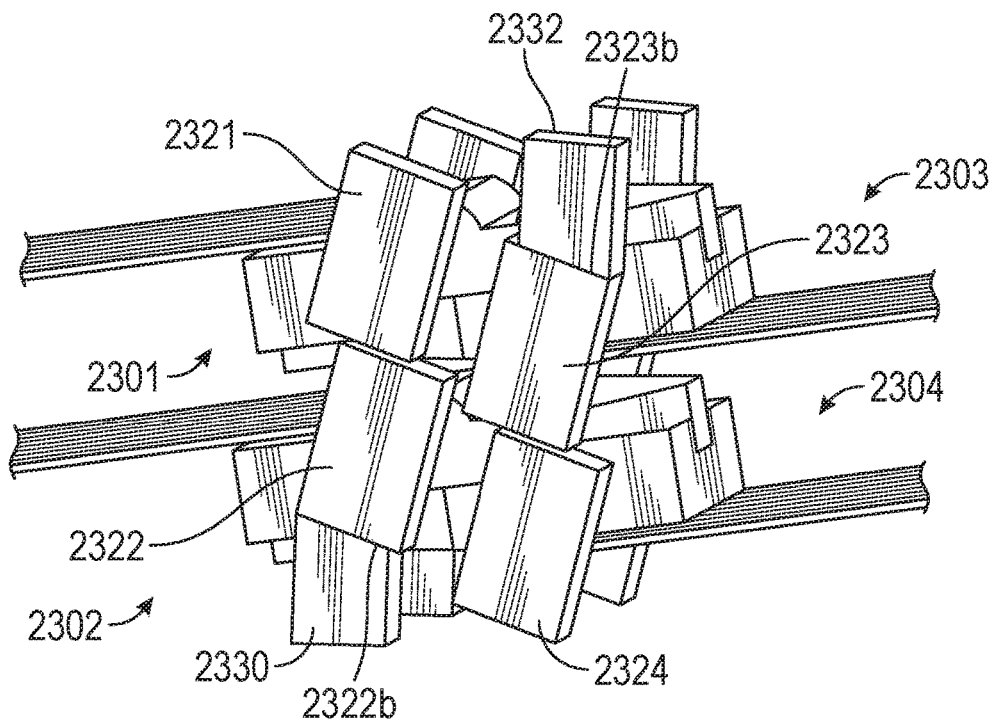

In FIGS. 23 and 24, perspective views show ferrules 2301-2304 according to another example embodiment. The unmated configuration of ferrules 2301-2304 is shown in FIG. 23 and the mated configuration is shown in FIG. 24. The ferrules 2301-2304 include rectangular stacking members 2321-2324 having distal ends 2321a-2324a extending beyond top surfaces 2311a-2314a of optical coupling members 2311-2314. The top surfaces 2311a-2314a are opposed to mating surfaces 2311b-2314b of the optical coupling members 2311-2314. Contact surfaces 2321b-2324b of the stacking members 2321-2324 in this example extend beyond the mating surfaces 2311b-2314b.

Two of the contact members 2322b, 2323b are shown riding against ferrule support members 2330, 2332 in the unmated configuration shown in FIG. 23. As with other embodiments, the ferrule support members 2330, 2332 are attached to a connector housing or other connector support. In the mated configuration shown in FIG. 24, the contact members 2322b, 2323b are lifted away from the ferrule support members 2330, 2332. Also note in this configuration that the optical coupling members 2311-2314 have top surface ridges (see ridges 2323c and 2324c extending from top surfaces 2313a, 2314a in FIG. 23) that act as stops/alignment features in the longitudinal direction 2307. In this example, the forces applied by the waveguides/fibers prevent the ferrules 2301-2304 from sliding forward while stacked in the mated configuration.

It will be understood that the stacking members shown in FIGS. 21-24 may include other shapes, including triangular shapes previously shown. The stacking members may also be referred to as extensions. Reference is made to other figures for analogous features shown in FIGS. 21-24 but not specifically described, such as optical waveguides, elements configured to redirect output light, etc.

Additional information regarding ferrules and connectors that may be used in conjunction with the approaches described herein is provided in the following commonly owned and concurrently filed U.S. Patent Applications which are incorporated herein by reference: U.S. Patent Application Ser. No. 62/239,998, having the title "Connector with Latching Mechanism"; U.S. Patent Application Ser. No. 62/240,069, having the title "Optical Ferrules"; U.S. Patent Application Ser. No. 62/240,066, having the title "Ferrules, Alignment Frames and Connectors,"; U.S. Patent Application Ser. No. 62/240,008, having the title "Optical Cable Assembly with Retainer,"; U.S. Patent Application Ser. No. 62/240,010, having the title "Optical Coupling Device with Waveguide Assisted Registration,"; U.S. Patent Application 62/239,996, having the title "Optical Ferrules and Optical Ferrule Molds,"; U.S. Patent Application 62/104,196, having the title "Configurable Modular Connectors,"; and U.S. Patent Application 62/240,005, having the title "Hybrid Connectors,".

Embodiments described in this disclosure include:

Item 1. An optical ferrule, comprising:
    an optical coupling member comprising:
    one or more light redirecting elements configured to redirect input light from a waveguide attached to the optical coupling member toward an output window of the optical coupling member; and
    a mating surface that includes the output window, the mating surface configured to slidably mate with a mating surface of a mating optical coupling member along a longitudinal axis of the optical ferrule; and
    at least one stacking member along a longitudinal edge of the optical coupling member, the at least one stacking member comprising:
        a distal end extending beyond one of the mating surface and a top surface opposed to the mating surface; and
        a contact surface opposed to the distal end, the contact surface configured to rotatably interface with a corresponding distal end of a corresponding stacking support member of an adjacently stacked optical ferrule.

Item 2. The optical ferrule of item 1, wherein the contact surface is further configured to slidably interface with the corresponding distal end of the corresponding stacking support member.

Item 3. The optical ferrule of any of items 1 and 2, where the at least one stacking member comprises first and second stacking members respectively located along opposing longitudinal edges of the optical coupling member.

Item 4. The optical ferrule of item 3, wherein the first and second stacking members are mirror images of one another.

Item 5. The optical ferrule of item 3, wherein the first and second stacking members align the optical ferrule in a side-to-side direction with a corresponding optical coupling member of the adjacently stacked optical ferrule.

Item 6. The optical ferrule of any of items 1-5, wherein the contact surface comprises a flat surface.

Item 7. The optical ferrule of any of item 1-5, wherein the contact surface comprises a curved surface.

Item 8. The optical ferrule of any of items 1-7, wherein the stacking member comprises a triangular shape, a vertex of the triangular shape corresponding to the distal end.

Item 9. The optical ferrule of any of items 1-8, wherein the contact surface and the corresponding distal end comprise a groove and a ridge, the ridge fitting into the groove in an unmated configuration of the optical ferrule and the adjacently stacked optical ferrule, the ridge and the groove aligning the optical ferrule and the adjacently stacked optical ferrule in a side-to-side direction.

Item 10. The optical ferrule of any of items 1-9, wherein the distal end extends beyond the mating surface and the contact surface is recessed below the top surface of the optical coupling member.

Item 11. The optical ferrule of any of items 1-9, wherein the distal end extends beyond the mating surface and the contact surface extends beyond the top surface of the optical coupling member.

Item 12. The optical ferrule of any of items 1-9, wherein the distal end extends beyond the top surface and the contact surface is recessed below the mating surface of the optical coupling member.

Item 13. The optical ferrule of any of items 1-12, wherein the optical ferrule and the adjacently stacked optical ferrule are part of a first connector and configured to optically interface with respective first and second stacked mating optical ferrules of a second connector in a mated configuration, wherein the contact surface is separated from the corresponding distal end of the corresponding stacking support member in the mated configuration.

Item 14. The optical ferrule of any of items 1-13, wherein the stacking members of the optical ferrule and the adjacently stacked optical ferrule of the first connector comprise stop surfaces that contact with corresponding stop surfaces of first and second stacking support members of the first and second stacked optical ferrules of the first connector in the mated configuration.

Item 15. An optical ferrule, comprising:
an optical coupling member comprising:
one or more light redirecting elements configured to redirect input light toward an output window of the optical coupling member; and
a mating surface that includes the output window, the mating surface configured to slidably mate with a mating surface of a mating optical coupling member along a longitudinal axis of the optical ferrule;
first and second extensions on opposed longitudinal edges of the optical coupling member, the first and second extensions extending beyond at least one of the mating surface and a top surface opposed to the mating surface; and
a first contact surface on the first extension, the first contact surface configured to slidably interface with an extension of a corresponding stacking support member of an adjacently stacked optical ferrule.

Item 16. The optical ferrule of item 15, further comprising a second contact surface on the second extension, the second contact surface configured to slidably interface with another extension of the corresponding stacking support member.

Item 17. The optical ferrule of any of items 15 and 16, wherein the first and second extensions are mirror images of one another.

Item 18. The optical ferrule of any of items 15-17, wherein the first contact surface comprises a flat surface.

Item 19. The optical ferrule of any of items 15-17, wherein the first contact surface comprises a curved surface.

Item 20. The optical ferrule of any of items 15-19, wherein the extension comprises a triangular shape, a vertex of the triangular shape slidably interfacing with a contact surface of a second adjacently stacked optical ferrule.

Item 21. The optical ferrule of any of items 15-20, wherein the first contact surface is recessed below a top surface of the optical coupling member, the top surface being opposed to the mating surface.

Item 22. The optical ferrule of any of items 15-21, wherein the optical ferrule and the adjacently stacked optical ferrule are part of a first connector and configured to optically interface with respective first and second stacked mating optical ferrules of a second connector in a mated configuration, wherein the first contact surface is separated from the corresponding distal end of the corresponding stacking support member in the mated configuration.

Item 23. The optical ferrule of item 22, wherein the stacking support members of the optical ferrule and the adjacently stacked optical ferrule of the first connector comprise stop surfaces that contact with corresponding stop surfaces of first and second stacking support members of the first and second stacked optical ferrules of the first connector in the mated configuration.

Item 24. A connector comprising:
a housing; and
at least one column of one or more adjacent optical cable assemblies disposed in the housing, each set of optical cable subassemblies comprising at least two optical cable subassemblies, each optical cable subassembly comprising:
an optical ferrule comprising:
an optical coupling member comprising:
one or more light redirecting elements configured to redirect input light toward an output window of the optical coupling member; and
a mating surface that includes the output window, the mating surface configured to slidably mate with a mating surface of a mating optical coupling member along a longitudinal axis of the optical ferrule; and
at least one extension along a longitudinal edge of the optical coupling member, the extension comprising:
a distal end extending beyond the mating surface; and
a contact surface opposed to the distal end, the contact surface configured to rotatably interface with a corresponding distal end of a corresponding extension of an adjacently stacked optical ferrule; and one or more optical waveguides attached to the optical ferrule, wherein, in an unmated configuration of the connector, the distal end of a first optical cable subassembly of the at least one column rotatably interfaces with the contact surface of a second optical cable subassembly of the at least one column.

Item 25. The connector of item 24, wherein the distal end of the first optical cable subassembly slidably interfaces with the contact surface of the second optical cable subassembly.

Item 26. The connector of any of items 24 and 25, wherein the distal end of the extension of only a selected one of the optical ferrules of the at least one column interfaces with a ferrule support attached to or integral with the connector housing.

Item 27. The connector of item 26, wherein the optical ferrules of the column are unsupported by the housing except for the selected optical ferrule.

Item 28. The connector of item 27, wherein the one or more optical waveguides in the cable assemblies apply spring forces to the respective optical ferrules, the spring forces holding the distal end of the first optical cable subassembly against the contact surface of the second optical cable subassembly and further hold the extension of selected optical ferrule against the ferrule support.

Item 29. The connector of item 28, wherein, in a mated configuration, the spring forces are applied between the mating surfaces of the at least one column with corresponding mating surfaces of a column of mating optical cable assemblies such that the extension of the first optical cable subassembly is separated from the contact surface of the second optical cable subassembly and the extension of the selected optical ferrule is separated from the ferrule support.

Item 30. A connector comprising:

a housing comprising at least one support extending respectively from at least one of first and second interior walls of the housing;

two or more optical cables assemblies stacked between the first and second interior walls, each comprising:
- one or more optical waveguides;
- an optical ferrule comprising one or more light redirecting elements configured to redirect input light toward an output window of the optical coupling member and a mating surface that includes the output window, the mating surface configured to slidably mate with a mating surface of a mating optical coupling member along a longitudinal axis of the optical ferrule;
- an extension along a longitudinal edge of the optical ferrule, the extension extending beyond the mating surface; and
- a contact surface along the longitudinal edge; and wherein the extension of a first of the two or more optical cable assemblies slidably interfaces with the contact surface of a second of the two or more optical cable assemblies, and wherein the extension of the second optical cable subassembly slidably interfaces with the at least one support of the housing.

Item 31. The connector of item 30, wherein the distal end of the first optical cable subassembly rotatably interfaces with the contact surface of the second optical cable subassembly.

Item 32. The connector of any of items 30-31, wherein the two or more optical cable assemblies are unsupported by the at least one support except for the first optical cable subassembly.

Item 33. The connector of item 32, wherein the one or more optical waveguides apply spring forces to the respective optical ferrules, the spring forces holding the extension of the first optical cable subassembly against the contact surface of the second optical cable subassembly and further hold the extension of second optical cable subassembly against the at least one support.

Item 34. The connector of item 33, wherein, in a mated configuration, the spring forces are applied between the mating surfaces of the two or more optical cable assemblies with corresponding mating surfaces of mating optical cable assemblies such that the extension of the first optical cable subassembly is separated from the contact surface of the second optical cable subassembly and the extension of the selected optical ferrule is separated from at least one support.

Item 35. A connector comprising:

a housing;

two or more columns of optical cable assemblies located side-by-side within the housing, each optical cable subassembly comprising:
- an optical ferrule comprising:
  - an optical coupling member comprising:
    - one or more light redirecting elements configured to redirect input light toward an output window of the optical coupling member; and
    - a mating surface that includes the output window, the mating surface configured to slidably mate with a mating surface of a mating optical coupling member along a longitudinal axis of the optical ferrule; and
  - at least one extension along a longitudinal edge of the optical coupling member, the at least one extension extending beyond the mating surface; and
  - a contact surface opposed to the at least one extension, the contact surface configured to rotatably interface with a corresponding extension of a an adjacently stacked optical ferrule; and
- one or more optical waveguides attached to the optical ferrule, wherein the extension of a first optical cable subassembly of each column slidably interfaces with the contact surface of a second optical cable subassembly of each column.

Item 36. The connector of item 35, wherein the extension of only a selected one optical ferrule of each column interfaces with a ferrule support attached to or integral with the connector housing.

Item 37. The connector of item 36, wherein the optical ferrules of the two or more columns are unsupported by the housing except for the selected optical ferrules of each column.

Item 38. The connector of item 37, wherein, for each column, the one or more optical waveguides in the cable assemblies apply spring forces to the respective optical ferrules, the spring forces holding the extension of the first optical cable subassembly against the contact surface of the second optical cable subassembly and further hold the extension of selected optical ferrule against the ferrule support.

Item 39. The connector of item 38, wherein, in a mated configuration, the spring forces are applied between the mating surfaces of each column with corresponding mating surfaces of corresponding columns of mating optical cable assemblies such that, for each column, the extension of the first optical cable subassembly is separated from the contact surface of the second optical cable subassembly and the extension of the selected optical ferrule is separated from the ferrule support.

Item 40. The connector of any of items 35-39, wherein the housing further comprises one or more inner sidewalls separating the two or more columns of optical cable assemblies, the one or more inner sidewalls limiting side-to-side movement of the two or more columns within the housing.

Item 41. The connector of item any of items 35-40, further comprising one or more side supports separating the two or more columns of optical cable assemblies, the one or more side supports limiting side-to-side movement within the housing of at least one optical ferrule within each of the two or more columns.

Item 42. A molded, unitary, optical ferrule comprising:
at least one stacking member along a longitudinal edge of the optical ferrule;
one or more parting line artifacts, the one or more parting line artifacts including a parting line artifact extending substantially around an external perimeter of the optical ferrule, the parting line artifacts dividing a surface of the optical ferrule into a first section along a first direction of a thickness axis and an opposing second section along a second direction of the thickness axis, wherein the first section comprises:
  a contact surface of the stacking member;
  one or more elements configured to receive and secure an optical waveguide; and
  one or more elements configured to redirect input light within the unitary optical ferrule; and
wherein the second section comprises
  at least one output window configured to transmit the redirected light out of a mating surface; and
  a distal end of the stacking member extending beyond the mating surface, the distal end configured to interface with a corresponding contact surface of a corresponding optical ferrule.

Item 43. The molded, unitary, optical ferrule of item 42, wherein at least part of the parting artifact extends along an intersection between the mating surface and the longitudinal edge.

Item 44. The molded, unitary, optical ferrule of any of items 42-43, wherein the stacking member comprises two stacking members respectively located along opposing longitudinal edges of the optical coupling member.

Item 45. The molded, unitary, optical ferrule of item 44, wherein the first and second stacking members are mirror images of one another.

Item 46. The molded, unitary, optical ferrule of any of items 42-45, wherein the contact surface comprises a flat surface.

Item 47. The molded, unitary, optical ferrule of any of items 42-45, wherein the contact surface comprises a curved surface.

Item 48. The molded, unitary, optical ferrule of any of items 42-47, wherein the stacking member comprises a triangular shape, a vertex of the triangular shape configured to interface with the corresponding contact surface.

Item 49. The molded, unitary, optical ferrule of any of items 42-48, wherein the contact surface is recessed below a top surface of the optical coupling member, the top surface opposed to the mating surface.

Item 50. A mold operable to injection mold a unitary, optical ferrule, the mold comprising:
a first part configured to form:
a contact surface of a stacking member of the unitary, optical ferrule;
one or more elements of the unitary, optical ferrule configured to receive and secure an optical waveguide; and
one or more elements of the unitary, optical ferrule configured to redirect input light within the unitary optical ferrule; and
a second part configured to form:
at least one output window of the unitary, optical ferrule configured to transmit the redirected light out of a mating surface of the unitary, optical ferrule; and
an extension of the stacking member comprising a distal end extending beyond the mating surface, the distal end configured to interface with a corresponding contact surface of a corresponding optical ferrule;
wherein respective first and second surfaces of the first and second parts form one or more parting line artifacts, the one or more parting line artifacts including a parting line artifact extending substantially around an external perimeter of the unitary optical ferrule.

Item 51. The mold of claim 50, wherein at least part of the parting artifact extends along an intersection between the mating surface and the longitudinal edge.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical ferrule, comprising:
an optical coupling member comprising:
  one or more light redirecting elements configured to redirect input light from a waveguide attached to the optical coupling member toward an output window of the optical coupling member; and
  a mating surface that includes the output window, the mating surface configured to slidably mate with a mating surface of a mating optical coupling member along a longitudinal axis of the optical ferrule; and
at least one stacking member along a longitudinal edge of the optical coupling member, the at least one stacking member comprising:
  a distal end extending beyond one of the mating surface and a top surface opposed to the mating surface; and
  a contact surface opposed to the distal end, the contact surface configured to rotatably interface with a corresponding distal end of a corresponding stacking support member of an adjacently stacked optical ferrule.

2. The optical ferrule of claim 1, wherein the contact surface is further configured to slidably interface with the corresponding distal end of the corresponding stacking support member.

3. The optical ferrule of claim 1, wherein the at least one stacking member comprises first and second stacking members respectively located along opposing longitudinal edges of the optical coupling member, and wherein the first and second stacking members align the optical ferrule in a side-to-side direction with a corresponding optical coupling member of the adjacently stacked optical ferrule.

4. The optical ferrule of claim 1, wherein the at least one stacking member comprises first and second stacking members respectively located along opposing longitudinal edges of the optical coupling member, the first and second stacking members being mirror images of one another.

5. The optical ferrule of claim 1, wherein the stacking member comprises a triangular shape, a vertex of the triangular shape corresponding to the distal end.

6. The optical ferrule of claim 1, wherein the contact surface and the corresponding distal end comprise a groove and a ridge, the ridge fitting into the groove in an unmated configuration of the optical ferrule and the adjacently stacked optical ferrule, the ridge and the groove aligning the optical ferrule and the adjacently stacked optical ferrule in a side-to-side direction.

7. The optical ferrule of claim 1, wherein the optical ferrule and the adjacently stacked optical ferrule are part of a first connector and configured to optically interface with respective first and second stacked mating optical ferrules of a second connector in a mated configuration, wherein the contact surface is separated from the corresponding distal end of the corresponding stacking support member in the mated configuration, and wherein the stacking members of the optical ferrule and the adjacently stacked optical ferrule of the first connector comprise stop surfaces that contact with corresponding stop surfaces of first and second stacking support members of the first and second stacked optical ferrules of the first connector in the mated configuration.

8. An optical ferrule, comprising:
an optical coupling member comprising:
one or more light redirecting elements configured to redirect input light toward an output window of the optical coupling member; and
a mating surface that includes the output window, the mating surface configured to slidably mate with a mating surface of a mating optical coupling member along a longitudinal axis of the optical ferrule;
first and second extensions on opposed longitudinal edges of the optical coupling member, the first and second extensions extending beyond at least one of the mating surface and a top surface opposed to the mating surface; and
a first contact surface on the first extension, the first contact surface configured to slidably interface with an extension of a corresponding stacking support member of an adjacently stacked optical ferrule.

9. The optical ferrule of claim 8, further comprising a second contact surface on the second extension, the second contact surface configured to slidably interface with another extension of the corresponding stacking support member.

10. The optical ferrule of claim 8, wherein the extension comprises a triangular shape, a vertex of the triangular shape slidably interfacing with a contact surface of a second adjacently stacked optical ferrule.

11. The optical ferrule of claim 8, wherein the optical ferrule and the adjacently stacked optical ferrule are part of a first connector and configured to optically interface with respective first and second stacked mating optical ferrules of a second connector in a mated configuration, wherein the first contact surface is separated from the corresponding distal end of the corresponding stacking support member in the mated configuration.

12. The optical ferrule of claim 11, wherein the stacking support member of the optical ferrule and the adjacently stacked optical ferrule of the first connector comprise stop surfaces that contact with corresponding stop surfaces of first and second stacking support members of the first and second stacked optical ferrules of the first connector in the mated configuration.

13. A connector comprising:
a housing; and
at least one column of one or more adjacent optical cable assemblies disposed in the housing, each set of optical cable subassemblies comprising at least two optical cable subassemblies, each optical cable subassembly comprising:
an optical ferrule comprising:
an optical coupling member comprising:
one or more light redirecting elements configured to redirect input light toward an output window of the optical coupling member; and
a mating surface that includes the output window, the mating surface configured to slidably mate with a mating surface of a mating optical coupling member along a longitudinal axis of the optical ferrule; and
at least one extension along a longitudinal edge of the optical coupling member, the extension comprising:
a distal end extending beyond the mating surface; and
a contact surface opposed to the distal end, the contact surface configured to rotatably interface with a corresponding distal end of a corresponding extension of an adjacently stacked optical ferrule; and
one or more optical waveguides attached to the optical ferrule,
wherein, in an unmated configuration of the connector, the distal end of a first optical cable subassembly of the at least one column rotatably interfaces with the contact surface of a second optical cable subassembly of the at least one column.

14. The connector of claim 13, wherein the distal end of the extension of only a selected one of the optical ferrules of the at least one column interfaces with a ferrule support attached to or integral with the connector housing, wherein the optical ferrules of the column are unsupported by the housing except for the selected optical ferrule, and wherein the one or more optical waveguides in the cable assemblies apply spring forces to the respective optical ferrules, the spring forces holding the distal end of the first optical cable subassembly against the contact surface of the second optical cable subassembly and further hold the extension of selected optical ferrule against the ferrule support.

15. The connector of claim 14, wherein, in a mated configuration, the spring forces are applied between the mating surfaces of the at least one column with corresponding mating surfaces of a column of mating optical cable assemblies such that the extension of the first optical cable subassembly is separated from the contact surface of the second optical cable subassembly and the extension of the selected optical ferrule is separated from the ferrule support.

16. A connector comprising:
a housing comprising at least one support extending respectively from at least one of first and second interior walls of the housing;
two or more optical cables assemblies stacked between the first and second interior walls, each comprising:
one or more optical waveguides;
an optical ferrule comprising one or more light redirecting elements configured to redirect input light toward an output window of the optical coupling member and a mating surface that includes the output window, the mating surface configured to slidably mate with a mating surface of a mating optical coupling member along a longitudinal axis of the optical ferrule;
an extension along a longitudinal edge of the optical ferrule, the extension extending beyond the mating surface; and
a contact surface along the longitudinal edge; and
wherein the extension of a first of the two or more optical cable assemblies slidably interfaces with the contact surface of a second of the two or more optical cable assemblies, and wherein the extension of the second optical cable subassembly slidably interfaces with the at least one support of the housing.

17. The connector of claim 16, wherein the distal end of the first optical cable subassembly rotatably interfaces with the contact surface of the second optical cable subassembly.

18. A connector comprising:
a housing;
two or more columns of optical cable assemblies located side-by-side within the housing, each optical cable subassembly comprising:
an optical ferrule comprising:
an optical coupling member comprising:
one or more light redirecting elements configured to redirect input light toward an output window of the optical coupling member; and
a mating surface that includes the output window, the mating surface configured to slidably mate with a mating surface of a mating optical coupling member along a longitudinal axis of the optical ferrule; and
at least one extension along a longitudinal edge of the optical coupling member, the at least one extension extending beyond the mating surface; and
a contact surface opposed to the at least one extension, the contact surface configured to rotatably interface with a corresponding extension of a an adjacently stacked optical ferrule; and
one or more optical waveguides attached to the optical ferrule,
wherein the extension of a first optical cable subassembly of each column slidably interfaces with the contact surface of a second optical cable subassembly of each column.

19. The connector of claim 18, wherein the housing further comprises one or more inner sidewalls separating the two or more columns of optical cable assemblies, the one or more inner sidewalls limiting side-to-side movement of the two or more columns within the housing.

20. The connector of claim 18, further comprising one or more side supports separating the two or more columns of optical cable assemblies, the one or more side supports limiting side-to-side movement within the housing of at least one optical ferrule within each of the two or more columns.

* * * * *

UNITED STATES PATENT AND TRADEMARK OFFICE
CERTIFICATE OF CORRECTION

| | |
|---|---|
| PATENT NO. | : 11,585,990 B2 |
| APPLICATION NO. | : 16/977111 |
| DATED | : February 21, 2023 |
| INVENTOR(S) | : Michael A Haase et al. |

It is certified that error appears in the above-identified patent and that said Letters Patent is hereby corrected as shown below:

In the Claims

Column 26
Line 16, In Claim 18, delete "extension of a an" and insert -- extension of an --, therefor.

Signed and Sealed this
Twenty-second Day of August, 2023

Katherine Kelly Vidal
Director of the United States Patent and Trademark Office